(12) United States Patent
Kim et al.

(10) Patent No.: US 11,508,259 B2
(45) Date of Patent: Nov. 22, 2022

(54) INFORMATION OUTPUT APPARATUS

(71) Applicant: DOT INCORPORATION, Seoul (KR)

(72) Inventors: Ju Yoon Kim, Incheon (KR); Ji Ho Kim, Incheon (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 1062 days.

(21) Appl. No.: 16/172,731

(22) Filed: Oct. 27, 2018

(65) Prior Publication Data

US 2019/0073923 A1 Mar. 7, 2019

Related U.S. Application Data

(63) Continuation of application No. PCT/KR2017/004526, filed on Apr. 27, 2017.

(30) Foreign Application Priority Data

Apr. 27, 2016 (KR) .................. 10-2016-0051613
May 4, 2016 (KR) .................. 10-2016-0055763
(Continued)

(51) Int. Cl.
*G09B 21/00* (2006.01)
*G06F 3/01* (2006.01)
(Continued)

(52) U.S. Cl.
CPC ............ *G09B 21/004* (2013.01); *G06F 3/016* (2013.01); *G08B 6/00* (2013.01); *H01H 3/02* (2013.01); *H01H 2003/0266* (2013.01)

(58) Field of Classification Search
CPC ......... G06F 3/016; G08B 6/00; G09B 21/004; H01H 3/02; H01H 2003/0266
See application file for complete search history.

(56) References Cited

U.S. PATENT DOCUMENTS 6,734,785 B2 * 5/2004 Petersen .............. G09B 21/004
340/407.1
9,815,085 B2 * 11/2017 Chun ..................... G06F 3/016
(Continued)

FOREIGN PATENT DOCUMENTS

CN 1653503 A 8/2005
JP 2001-265213 A 9/2001
(Continued)

*Primary Examiner* — Vinh T Lam
(74) *Attorney, Agent, or Firm* — Novick, Kim & Lee PLLC; Jae Youn Kim

(57) ABSTRACT

Provided is an information output apparatus. The information output apparatus includes: an expression surface including a plurality of expression holes; a plurality of pins configured to protrude to the expression surface through the expression holes and express a protrusion signal on the expression surface; a plurality of first movement units located at an inner side of the expression surface and configured such that at least a portion of the plurality of first movement units moves in a first direction when an electric signal is applied thereto; and a plurality of second movement units located at the inner side of the expression surface and configured to move in a second direction different from the first direction in cooperation with the motion of the first movement units and drive each of the plurality of pins such that the each of the plurality of pins protrudes to the expression surface through each of the expression holes.

17 Claims, 33 Drawing Sheets

(30) Foreign Application Priority Data

May 31, 2016 (KR) ........................ 10-2016-0067744
Jun. 23, 2016 (KR) ........................ 10-2016-0078611

(51) Int. Cl.
*G08B 6/00* (2006.01)
*H01H 3/02* (2006.01)

(56) References Cited

U.S. PATENT DOCUMENTS

| | | | |
|---|---|---|---|
| 9,830,783 B1* | 11/2017 | Kessler | .................... G06F 1/163 |
| 9,966,825 B2* | 5/2018 | Hajati | ..................... G06F 3/016 |
| 2002/0050923 A1* | 5/2002 | Petersen | .............. G09B 21/004 |
| | | | 340/407.1 |
| 2005/0158695 A1* | 7/2005 | Takahashi | ............ G09B 21/004 |
| | | | 340/407.1 |
| 2006/0044271 A1* | 3/2006 | Anastas | .................. G06F 3/016 |
| | | | 345/163 |
| 2006/0143342 A1* | 6/2006 | Kim | ........................ G06F 3/046 |
| | | | 710/73 |
| 2006/0290662 A1* | 12/2006 | Houston | .................. A63F 13/06 |
| | | | 345/156 |
| 2008/0297328 A1* | 12/2008 | Crawford | ............. A63F 13/285 |
| | | | 340/407.2 |
| 2009/0023116 A1* | 1/2009 | Shaw | ................... G09B 21/003 |
| | | | 434/114 |
| 2010/0159423 A1 | 6/2010 | Hashizume et al. | |
| 2013/0017516 A1 | 1/2013 | Tyler | |
| 2016/0224116 A1* | 8/2016 | Hagedorn | ................. G06F 3/14 |
| 2017/0090572 A1* | 3/2017 | Holenarsipur | ........ G06F 3/0362 |
| 2017/0352291 A1 | 12/2017 | Kim et al. | |

FOREIGN PATENT DOCUMENTS

| | | | | |
|---|---|---|---|---|
| JP | 2004-317729 A | 11/2004 | | |
| JP | 2005-266358 A | 9/2005 | | |
| KR | 10-2008-0086203 A | 9/2008 | | |
| KR | 10-2010-0062768 A | 6/2010 | | |
| KR | 10-1597911 B1 | 3/2016 | | |
| WO | 2003/077410 A1 | 9/2003 | | |
| WO | WO-2005026932 A1 * | 3/2005 | ............. | G06F 3/016 |
| WO | WO-2011062910 A1 * | 5/2011 | ............. | G05G 1/08 |
| WO | 2015/077846 A1 | 6/2015 | | |
| WO | WO-2016010180 A1 * | 1/2016 | ............. | B06B 1/045 |

* cited by examiner

INFORMATION OUTPUT APPARATUS

CROSS-REFERENCE TO RELATED APPLICATIONS

This application is a continuation of PCT application No. PCT/KR2017/004526 filed on Apr. 27, 2017, the entire contents of which are hereby incorporated by reference.

TECHNICAL FIELD

The present disclosure relates to an information output apparatus.

BACKGROUND ART

Users may recognize information in various ways. In view of this, various types of information output apparatuses are used.

For example, a visual information output apparatus that uses printed materials, an auditory information output apparatus using sound, etc. are used.

Particularly, in modern times, in accordance with an increase in the amount of information and technological development, information output apparatuses including electronic technology have been widely used and display devices including a plurality of pixels have been commonly used as visual information output apparatuses.

However, since a display device includes various circuits and the like, ease of manufacture is reduced and control of the display device is inconvenient.

Meanwhile, various forms of information output are required due to technological development, diversification of living habits, etc.

For example, various information output apparatuses are required depending on the circumstances of each user, and particularly, information output through a sense of touch is required for a user who has a particular weakened sense, for example, a user who has weakened sight or no sight at all.

When information is output through a sense of touch, there is difficulty in easily controlling and stably driving the information output through a sense of touch. Therefore, there is a limit in improving user convenience through improvement of an information output apparatus.

DESCRIPTION OF EMBODIMENTS

Technical Problem

Provided is an information output apparatus that improves durability and improves user convenience.

Provided is an information output apparatus that minimizes power consumption.

Solution to Problem

According to an aspect of the present disclosure, an information output apparatus includes: an expression surface including a plurality of expression holes; a plurality of pins configured to protrude to the expression surface through the expression holes and express a protrusion signal on the expression surface; a plurality of first movement units located at an inner side of the expression surface and configured such that at least a portion of the plurality of first movement units moves in a first direction when an electric signal is applied thereto; and a plurality of second movement units located at the inner side of the expression surface and configured to move in a second direction different from the first direction in cooperation with the motion of the first movement units and drive each of the plurality of pins such that the each of the plurality of pins protrudes to the expression surface through each of the expression holes.

The expression surface may include a curved surface.

The first direction and the second direction may form a directional angle, and the directional angle may be greater than 0° and less than 180°.

Each of the first movement units may include: a first guide in which a first guide hole is provided; a magnetic force member located in the first guide hole; and a coil member located on an outer side of the first guide and to which the electric signal is applied.

At least one of the magnetic force member, the first guide, and the second movement unit may include an inclined surface inclined with respect to the first direction or the second direction.

The information output apparatus may further include a stopper located in the first guide hole.

The information output apparatus may further include a plurality of second guides configured to guide movement of the second movement units, respectively.

The information output apparatus may further include a transfer unit arranged between the first movement units and the second movement units and configured to transfer the movement of the first movement units to the second movement units.

The information output apparatus may further include at least one magnetic body located opposite the first movement units.

According to another aspect of the present disclosure, an information output apparatus includes: a first movement unit including a magnetic force member and a coil member and configured such that at least a portion of the first movement unit performs a reciprocating motion in a first direction in response to an electric signal applied to the coil member; a second movement unit configured to cooperate with the motion of the first movement unit and perform a reciprocating motion in a second direction different from the first direction; and a pin configured to perform a reciprocating motion in a third direction in cooperation with the motion of the second movement unit.

The third direction may be the same as the second direction.

The information output apparatus may further include a first guide in which a first guide hole is provided, wherein the magnetic force member may be located in the first guide hole, and the coil member may be located on an outer side of the first guide.

At least one of the magnetic force member, the first guide, and the second movement unit may include an inclined surface inclined with respect to the first direction or the second direction.

The information output apparatus may further include a stopper located in the first guide hole.

The information output apparatus may further include a first magnetic body facing the magnetic force member and adjacent to the coil member.

The information output apparatus may further include a second guide configured to guide the motion of the second movement unit.

The information output apparatus may further include: a first guide in which a first guide hole that extends in the first direction is provided; and a second guide in which a second guide hole that extends in the second direction is provided, the second guide being connected to the first guide, wherein the magnetic force member may be located in the first guide hole, the coil member may be located on an outer side of the first guide, and at least a portion of the second movement unit may be located in the second guide hole.

The information output apparatus may further include a transfer unit arranged between the first movement unit and the second movement unit and configured to transfer the motion of the first movement unit to the second movement unit.

According to another aspect of the present disclosure, an information output apparatus includes: a first movement unit configured such that at least a portion of the first movement unit performs a reciprocating motion in a first direction when an electric signal is applied thereto and including at least one magnetic force member and a coil member; a second movement unit configured to cooperate with the motion of the first movement unit and perform a reciprocating motion in a second direction different from the first direction; a pin configured to perform a reciprocating motion in a third direction in cooperation with the motion of the second movement unit; and a transfer unit coupled to at least a portion of the first movement unit and configured to transfer the motion of the first movement unit to the second movement unit.

The first movement unit may include a first guide in which a first guide hole is provided; a magnetic force member located in the first guide hole; and a coil member located on an outer side of the first guide and to which the electric signal is applied.

The information output apparatus may further include a stopper provided at a location facing the transfer unit in the first direction.

The stopper may include an intermediate member that faces a support member.

The information output apparatus may further include a magnetic body adjacent to the magnetic force member.

The magnetic force member may include a first magnetic body and a second magnetic body facing each other, the transfer unit may be located between the first magnetic body and the magnetic force member, and the second magnetic body may be spaced apart from the magnetic force member.

The information output apparatus may further include a base including a guide protrusion, and the second movement unit may include a guide recess in which the guide protrusion is inserted.

The second movement unit may further include a support surface adjacent to the transfer unit and configured to support the transfer unit.

The support surface may be located to be offset from a central line in the first direction.

According to another aspect of the present disclosure, an information output apparatus has an expression surface including a plurality of expression holes, and includes a plurality of information output modules located at an inner side of the expression surface, each of the information output modules including: a pin configured to protrude to the expression surface through the expression hole and express a protrusion signal on the expression surface; a first movement unit configured such that at least a portion of the first movement unit performs a reciprocating motion in a first direction when an electric signal is applied thereto, and including at least one magnetic force member and a coil member; a second movement member configured to cooperate with the motion of the first movement unit, perform a reciprocating motion in a second direction different from the first direction, and drive the pin such that the pin protrudes to the expression surface through the expression hole; and a transfer unit coupled to at least a portion of the first movement unit and configured to transfer the motion of the first movement unit to the second movement unit.

First movement units of at least two information output modules adjacent in the first direction may be located to be offset from each other with respect to the first direction.

Each of the information output modules may further include a magnetic body adjacent to the magnetic force member.

The magnetic force member may include a first magnetic body and a second magnetic body facing each other, the transfer unit may be located between the first magnetic body and the magnetic force member, and the second magnetic body may be spaced apart from the magnetic force member.

Each of the information output modules may further include a base including a plurality of guide protrusions, and the second movement unit of each of the information output modules may include a guide recess in which the guide protrusion is inserted.

According to another aspect of the present disclosure, an information output apparatus includes: a first movement unit including a magnetic force member and a coil member and configured such that the magnetic force member performs a reciprocating motion in a first direction in response to an electric signal applied to the coil member; a second movement unit configured to cooperate with the motion of the magnetic force member and perform a reciprocating motion in a second direction different from the first direction; a pin configured to perform a reciprocating motion in a third direction in cooperation with the motion of the second movement unit; and a transfer unit arranged between the magnetic force member and the second movement unit and configured to transfer the motion of the magnetic force member to the second movement unit.

The information output apparatus may further include: a first guide in which a first guide hole that extends in the first direction is provided; and a second guide in which a second guide hole that extends in the second direction is provided, the second guide being connected to the first guide, wherein the magnetic force member may be located in the first guide hole, the coil member may be located at an outer side of the first guide, and at least a portion of the second movement unit may be located in the second guide hole.

The information output apparatus may further include at least one magnetic body facing the magnetic force member.

The information output apparatus may further include a stopper arranged between the magnetic body and the magnetic force member.

The stopper may be provided in a ball shape.

The information output apparatus may further include an intermediate member adjacent to the second movement unit or the transfer unit.

The second guide may include a guide recess that extends in the second direction, and the second movement unit may include a guide pin fit in the guide recess.

The information output apparatus may further include: a first base adjacent to the coil member and including a through hole corresponding to at least a portion of the coil member; a second base facing the first base and configured such that the first movement unit, the second movement unit, and the transfer unit are located between the first base and the second base; and a board facing the first base and including a wiring unit electrically connected with the coil member through the through hole.

According to another aspect of the present disclosure, an information output apparatus has an expression surface including a plurality of expression holes, and includes a plurality of information output modules located at an inner side of the expression surface, each of the information expression modules including: a pin configured to protrude to the expression surface through the expression holes and express a protrusion signal on the expression surface; a magnetic force member; and a coil member, the information output apparatus including: a first movement unit configured such that the magnetic force member performs a reciprocating motion in a first direction when an electric signal is applied thereto; a second movement unit configured to cooperate with the motion of the magnetic force member, perform a reciprocating motion in a second direction different from the first direction, and drive the pin such that the pin protrudes to the expression surface through the expression holes; and a transfer unit arranged between the magnetic force member and the second movement unit and configured to transfer the motion of the magnetic force member to the second movement unit.

Each of the information output modules may further include a magnetic body adjacent to the magnetic force member.

Each of the information output modules may further include a stopper arranged between the magnetic body and the magnetic force member.

Each of the information output modules may further include: a first guide in which a first guide hole that extends in the first direction is provided; and a second guide in which a second guide hole that extends in the second direction is provided, the second guide being connected to the first guide, wherein the magnetic force member may be located in the first guide hole, the coil member may be located at an outer side of the first guide, and at least a portion of the second movement unit may be located in the second guide hole.

The transfer unit may be located inside the first guide or the second guide.

The information output apparatus may further include: a first base including a partition wall structure configured to fixedly mount the information output modules and including a plurality of through holes corresponding to at least a portion of each coil member; a second base facing the first base and configured such that the information output modules are located between the first base and the second base; and a board facing the first base and including a wiring unit electrically connected with the information output modules through the through holes.

According to another aspect of the present disclosure, an information output apparatus includes: an expression surface including a plurality of expression holes; a plurality of pins respectively configured to protrude to the expression surface through the expression holes and express a protrusion signal on the expression surface; a plurality of first movement units located inside the expression surface, including a magnetic force member and a coil member, and configured such that at least a portion of the first movement unit moves in a first direction in response to an electric signal applied to the coil member; a plurality of second movement units located inside the expression surface, and respectively configured to move in cooperation with the motions of the first movement units and drive each of the plurality of pins such that each of the plurality of pins protrudes to the expression surface through the expression holes; and at least one magnetic body adjacent to the plurality of first movement units.

The magnetic body may face the first movement unit in the first direction.

The magnetic body may face the magnetic force member in the first direction.

The magnetic body may contact the coil member.

The magnetic body may be spaced apart from the magnetic force member.

The information output apparatus may further include a stopper arranged between the magnetic body and the magnetic force member.

According to another aspect of the present disclosure, an information output apparatus includes: a first movement unit including a magnetic force member and a coil member and configured such that at least a portion of the first movement unit moves in a first direction in response to an electric signal applied to the coil member; a second movement unit configured to move in cooperation with the motion of the first movement unit; a pin configured to move in cooperation with the motion of the second movement unit; and a magnetic body adjacent to the first movement unit.

The magnetic body may include a first magnetic body adjacent to the coil member.

The first magnetic body may contact the coil member.

The magnetic body may include a second magnetic body facing the magnetic force member in the first direction.

The information output apparatus may further include a stopper arranged between the second magnetic body and the magnetic force member.

Advantageous Effects of Disclosure

An information output apparatus according to embodiments may improve durability and improve user convenience.

An information output apparatus according to embodiments may reduce power consumption.

An information output apparatus according to embodiments may minimize an operation error of a driving module.

MODE OF DISCLOSURE

Figure 1:
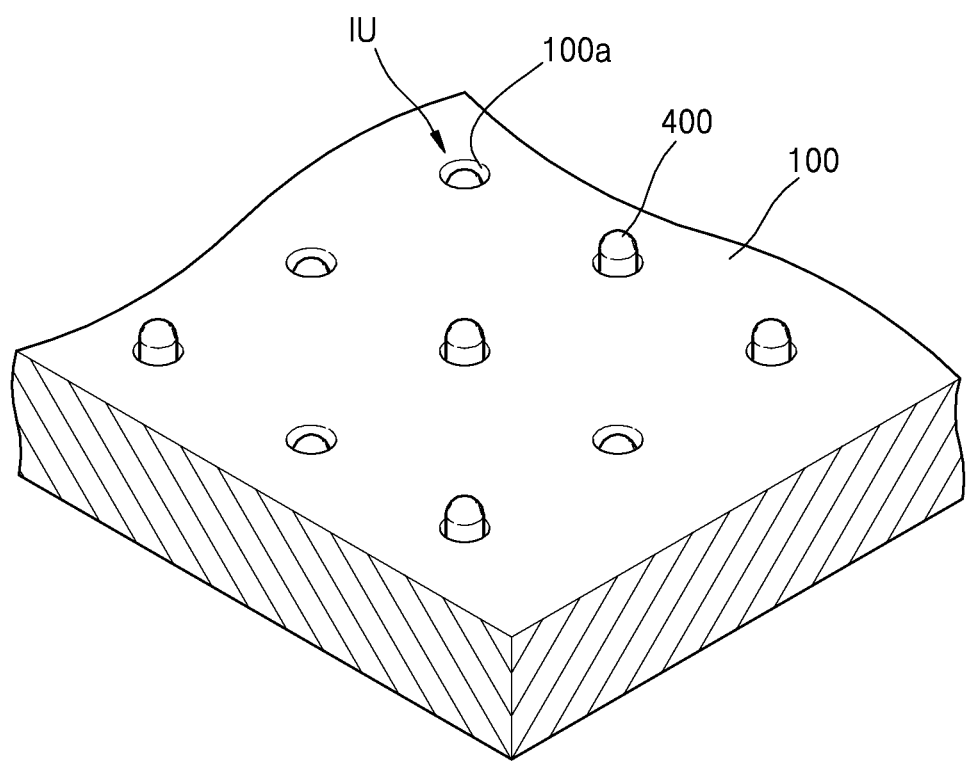
FIG. 1 is a perspective view of an information output apparatus according to an embodiment.

As the disclosure allows for various changes and numerous embodiments, example embodiments will be illustrated in the drawings and described in detail in the written description. An effect and a characteristic of the disclosure, and a method of accomplishing these will be apparent when referring to embodiments described with reference to the drawings. This disclosure may, however, be embodied in many different forms and should not be construed as limited to the example embodiments set forth herein.

Hereinafter, the disclosure will be described more fully with reference to the accompanying drawings, in which example embodiments of the disclosure are shown. When description is made with reference to the drawings, like reference numerals in the drawings denote like or corresponding elements, and repeated description thereof will be omitted.

It will be understood that although the terms "first", "second", etc. may be used herein to describe various components, these components should not be limited by these terms. These components are only used to distinguish one component from another.

As used herein, the singular forms "a", "an" and "the" are intended to include the plural forms as well, unless the context clearly indicates otherwise.

It will be further understood that the terms "comprises/includes" and/or "comprising/including" used herein specify the presence of stated features or components, but do not preclude the presence or addition of one or more other features or components.

Sizes of elements in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

In the present specification, like reference numerals are used for like elements.

FIG. 1 is a perspective view of an information output apparatus according to an embodiment.

Referring to FIG. 1, the information output apparatus according to an embodiment may include an expression surface 100 including a plurality of expression holes 100a. This expression surface 100 may include a flat surface as shown in FIG. 1.

A plurality of information output modules IU are located on an inner side of the expression surface 100, and the information output modules IU respectively correspond to the expression holes 100a, and a pin 400 of each of the information output modules IU may express a protrusion signal on the expression surface 100 by protruding to the expression surface 100 through the expression hole 100a. This protrusion signal may constitute various signal systems by allowing the plurality of pins 400 to repeat a selective protrusion through the expression holes 100a.

The information output apparatus may be configured such that the expression surface 100 faces a user. Therefore, a protrusion signal by selective protrusion of the pins 400 expressed on the expression surface 100 may be recognized as a direct and local hit to a user, and the user may receive a direct vibration at a position which has received a hit by the pins 400. Unlike a general vibration signal of a portable electronic apparatus, since a protrusion signal formed by the direct and local hit does not produce a small vibration around a target, the protrusion signal may transfer an accurate signal to the user. Therefore, a signal achieved through a tactile sense such as Braille may be implemented by the above-described protrusion signal, and besides, various signals such as a military signal, a picture signal, a code signal, and a direction signal may be accurately implemented.

Figure 2:
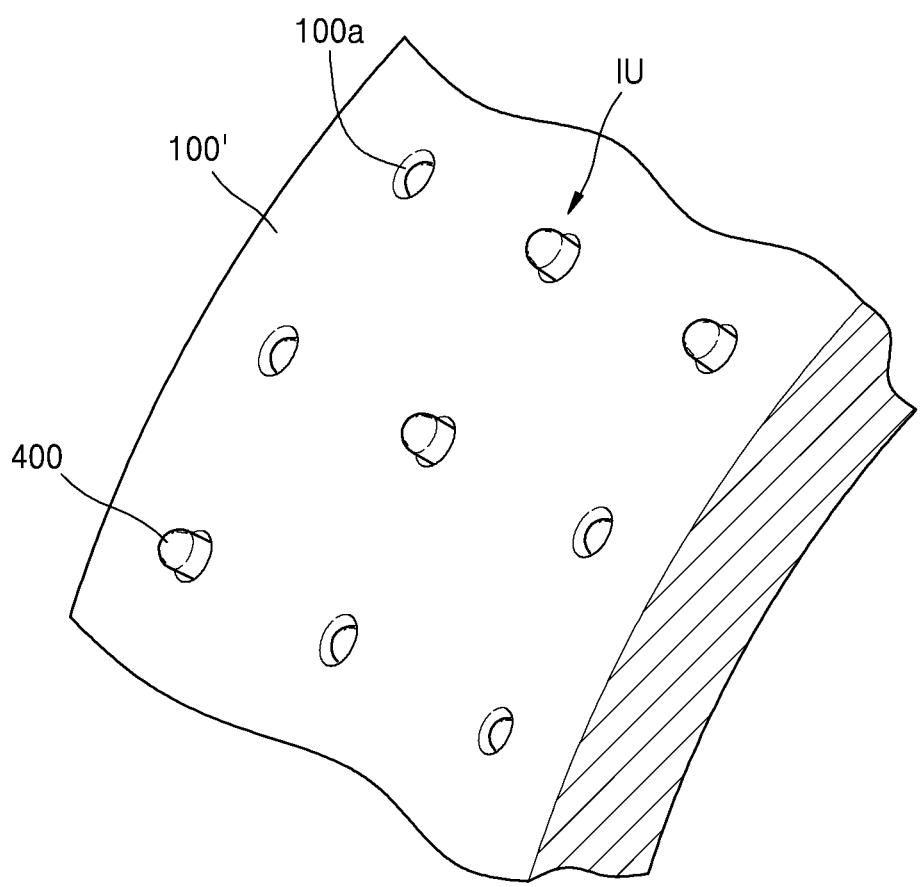
FIG. 2 is a perspective view of an information output apparatus according to another embodiment.

FIG. 2 is a perspective view of an information output apparatus according to another embodiment.

The information output apparatus according to the embodiment shown in FIG. 2 includes an expression surface 100' including a curved surface. The expression surface 100' including the curved surface may also include a plurality of expression holes 100*a*, and the information output module IU may be located on an inner side of the expression hole 100*a*. Though FIG. 2 illustrates that the curved surface has a single curvature, the present disclosure is not limited thereto and the curved surface may include a curved surface of an indeterminate form having a plurality of curvatures. In this case, open directions of at least some of the expression holes 100*a* may be different from each other and accordingly, protrusion directions of at least some of the pins 400 may be different from each other.

Figure 3:
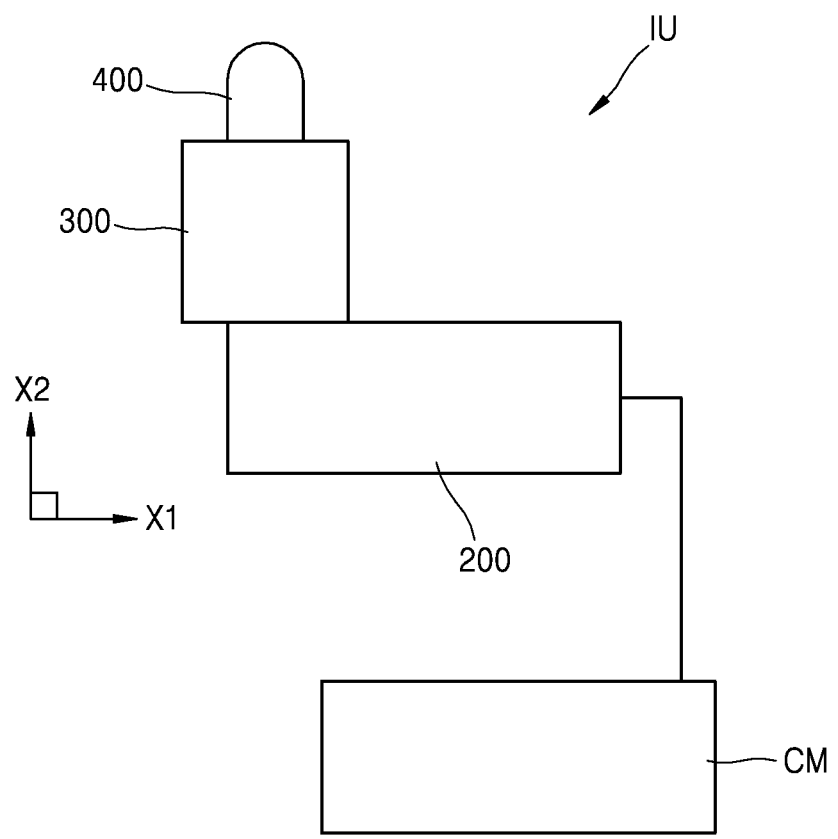
FIG. 3 is a configuration view of an information output module according to an embodiment.

As described above, the information output apparatus includes the plurality of information output modules IU. FIG. 3 is a configuration view of an information output module according to an embodiment.

Referring to FIG. 3, the information output module IU according to an embodiment may include a first movement unit 200, a second movement unit 300, and a pin 400.

The first movement unit 200 is electrically connected to a control module CM. The first movement unit 200 may be configured such that at least a portion of the first movement unit 200 moves in a first direction X1 when an electric signal from the control module CM is applied thereto. The expression of the electric connection does not necessarily denote a wired connection and includes transferring a signal through wireless communication and includes existence of another transfer medium therebetween. This is equally applicable to embodiments of the present specification.

The second movement unit 300 may be configured to move in a second direction X2 in cooperation with the motion of the first movement unit 200. The second movement unit 300 may move, subject to the motion of the first movement unit 200. Therefore, the second movement unit 300 may not be electrically connected to the control module CM.

The pin 400 is driven by the second movement unit 300 and may move in a third direction.

According to an embodiment, the pin 400 may be connected with the second movement unit 300. In this case, since the second movement unit 300 moves in the second direction X2, the third direction is the same as the second direction X2. Therefore, the pin 400 may selectively protrude in the second direction X2 through the expression hole.

However, the present disclosure is not limited thereto and at least some of the pins 400 may be separated from the second movement unit 300. In this case, the pin 400 may directly contact the second movement unit 300, or may indirectly cooperate with the motion of the second movement unit 300 in the second direction X2 through a separate link mechanism (not shown) or a separate motion transfer mechanism (not shown) with the second movement unit 300 to move in the third direction. The third direction, which is a motion direction of the pin 400, may include various directions including the second direction X2, which is the motion direction of the second movement unit 300, and the first direction X1. In this case, the third direction, which is the motion direction of the pin 400, may be a protrusion direction for implementing the above-described protrusion signal. Though embodiments of the present specification are based on the embodiment in which the pin 400 is coupled to the second movement unit 300, the present disclosure is not limited thereto and is equally applicable to an embodiment in which the pin 400 is separated from the second movement unit 300.

The second direction X2 may be a direction different from the first direction X1. According to the embodiment shown in FIG. 3, the second direction X2 may form a right angle with the first direction X1.

Selectively, when a position of the information output apparatus changes like a case where the information output apparatus overturns, to prevent the pin 400 and/or the second movement unit 300 from protruding to the outside of the expression surface 100 with power not applied to the first movement unit 200, a separate apparatus (not shown) may be arranged between the pin 400 and/or the second movement unit 300 and the expression surface 100. This apparatus may be an elastic member, and when moving force of the first movement unit 200 exceeds elastic force of the elastic member, the pin 400 may protrude to the outside of the expression surface 100. This embodiment is applicable to all of embodiments of the present specification.

Figure 4:
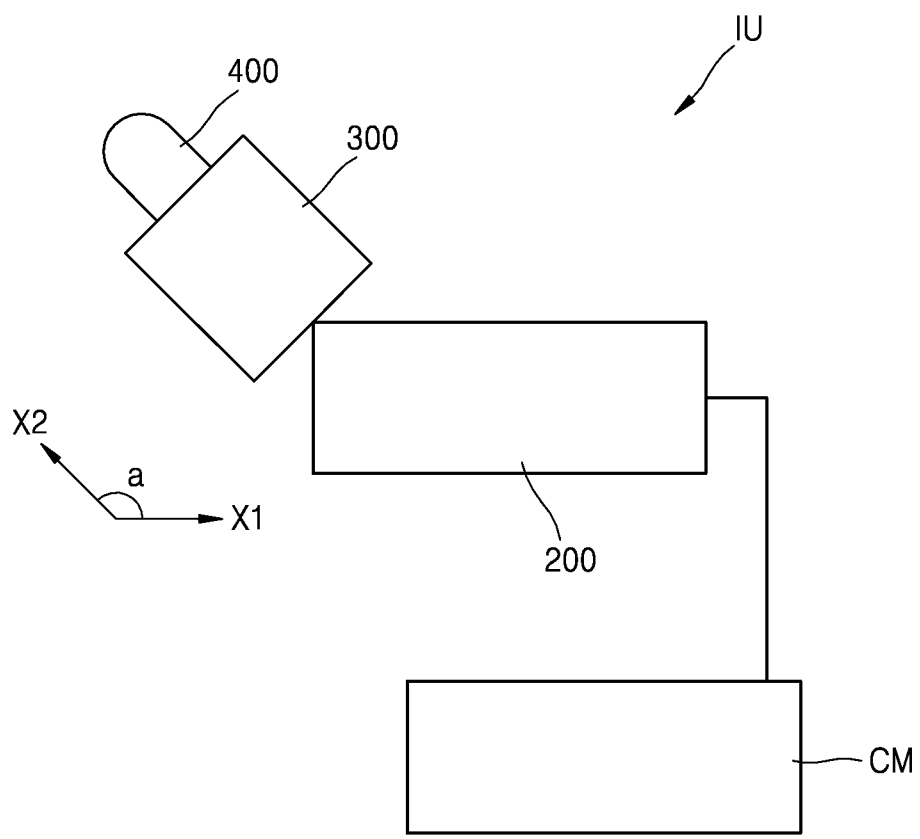
FIG. 4 is a configuration view of an information output module according to another embodiment.

FIG. 4 is a configuration view of an information output module according to another embodiment. As viewed in FIG. 4, the first direction X1 and the second direction X2 are configured to form a directional angle a, and the directional angle a may be greater than 0° and less than 180°. The directional angle a may be determined by taking into account a space in which the first movement unit 200 is arranged, a space in which the second movement unit 300 is arranged, and the third direction, which is a motion direction of the pin 400. Also, in the case where the plurality of information output modules IU are provided as in the embodiments shown in FIGS. 1 and 2, it may be set such that each information output module IU has a different directional angle or, in the case where a plurality of information output modules IU form a group, the groups respectively have different directional angles. This is equally applicable to all of the embodiments of the present specification.

In the information output module IU according to the above embodiment, since a motion direction of the first movement unit 200 is different from a motion direction of the second movement unit 300, it is easy to maintain a protruded state even after the pin 400 protrudes, and also, even when electricity is not applied to the first movement unit 200, the pin 400 may maintain a protruded state. Therefore, an operation of the pin 400 may be freely performed even without an excessive use of power.

Figure 5:
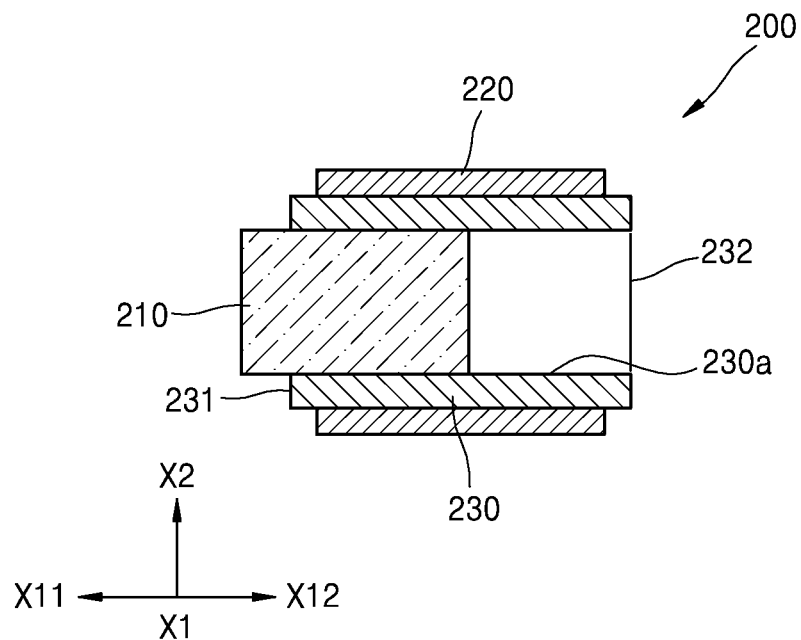
FIG. 5 is a cross-sectional view of a first movement unit according to an embodiment.

FIG. 5 is a cross-sectional view of the first movement unit 200 according to an embodiment.

The first movement unit 200 may include a first guide 230, a magnetic force member 210 (also referred to as a magnet), and a coil member 220.

The first guide 230 is configured to have a first guide hole 230*a* therein, and the first guide hole 230*a* may extend in the first direction X1. The first guide 230 according to an embodiment shown in FIG. 5 may be provided in a pipe shape and may include a first end 231, which is an end in a (1-1)st direction X11, which is one direction of the first direction X1, and a second end 232, which is an end in a (1-2)nd direction X12, which is another direction of the first direction X1. According to an embodiment, the first end 231 and the second end 232 may be open and are not limited thereto. At least the second end 232 may be closed.

The coil member 220 may be located on an outer side of the first guide 230. According to an embodiment, the coil member 220 may be a coil wound along an outer surface of the first guide 230. The coil member 220 is electrically connected to the control module CM. Though it is illustrated that the coil member 220 is wound on a portion of the first guide 230 in the accompanying drawings of the present specification, the present disclosure is not limited thereto and the coil member 220 may extend to at least one of the first end 231 and the second end 232 of the first guide 230 and may be wound thereon.

The magnetic force member 210 may be located in the first guide hole 230a. According to an embodiment, the magnetic force member 210 may be exposed to the outside of the first guide 230 in the (1-1)st direction through the first end 231. The magnetic force member 210 may move along the first guide hole 230a such that at least a portion thereof is exposed through the first end 231 and thus drive the second movement unit 300. In this case, a fixed state of the first guide 230 may be maintained and the second movement unit 300 may be driven by only the motion of the magnetic force member 210. For the magnetic force member 210, a permanent magnet may be used and is not limited thereto, and a magnetic body having an N-pole and an S-pole on two opposite sides in the first direction X1 may be used. The magnetic force member 210 may be configured such that an outer surface thereof contacts the first guide hole 230a and is not limited thereto. Any magnetic force member is applicable as far as the magnetic force member has a shape that is movable along the first guide hole 230a.

The first movement unit 200 according to this embodiment is applicable to all embodiments of the present specification.

Figure 6:
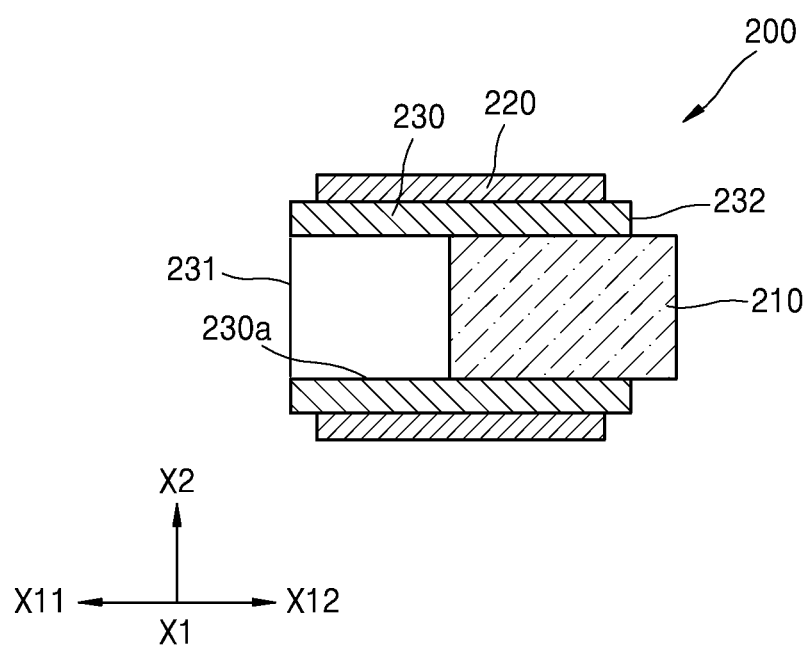
FIG. 6 is a cross-sectional view of a first movement unit according to another embodiment.

FIG. 6 is a cross-sectional view of the first movement unit 200 according to another embodiment.

According to the embodiment shown in FIG. 6, the magnetic force member 210 may maintain a fixed state, and the first guide 230 and the coil member 220 may move. For this purpose, as shown in FIG. 6, the magnetic force member 210 may be exposed through the second end 232, and the exposed portion may be fixed to another member (not shown).

Though it is shown that the first end 231 is open in FIG. 6, the present disclosure is not limited thereto and the first end 231 may be closed by itself or another member (not shown).

The first movement unit 200 according to the embodiment is applicable to all embodiments of the present specification.

Figure 7:
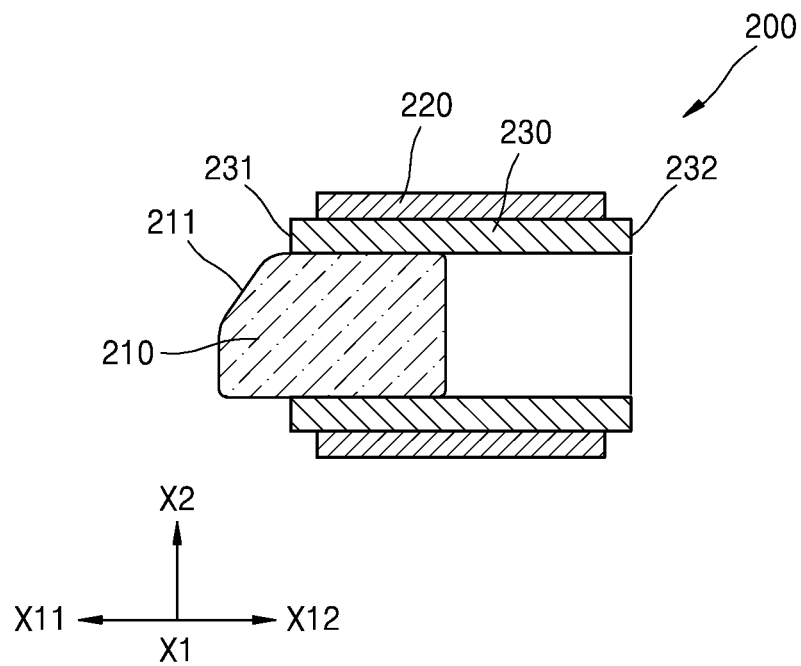
FIG. 7 is a cross-sectional view of a first movement unit according to another embodiment.

FIG. 7 is a cross-sectional view of the first movement unit 200 according to another embodiment.

The first movement unit 200 according to the embodiment may include the magnetic force member 210 including a first inclined surface 211. The first inclined surface 211 may be inclined with respect to the first direction X1 or the second direction X2. The first inclined surface 211 contacts the second movement unit 300 or a transfer unit described below and directly transfers power of the first movement unit 200 to the second movement unit 300. In this case, since the first inclined surface 211 is inclined, the first inclined surface 211 may more smoothly transfer the power to the second movement unit 300 or the transfer unit. Also, excessive abrasion may be prevented from occurring on a power transfer surface during a repeated power transfer process.

The embodiment is applicable to all embodiments of the present specification.

Figure 8:
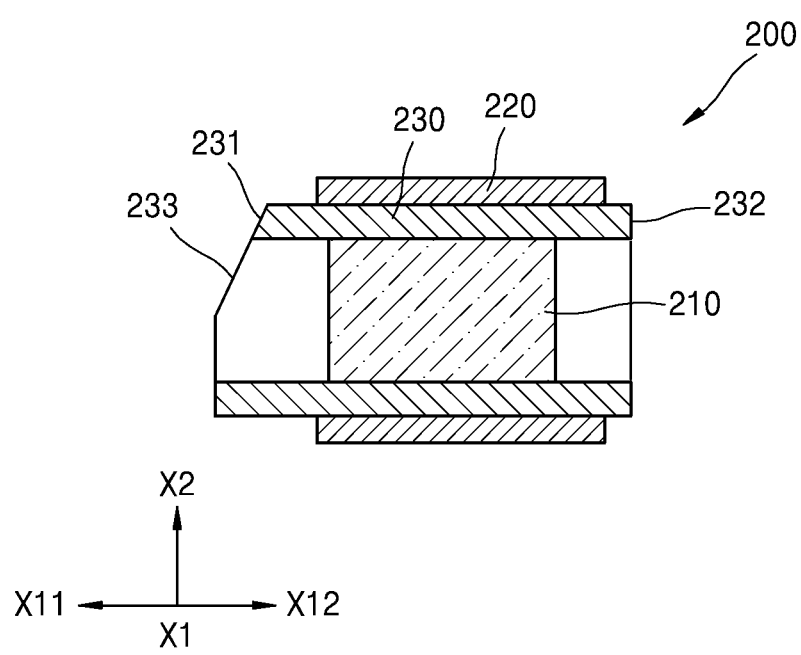
FIG. 8 is a cross-sectional view of a first movement unit according to another embodiment.

FIG. 8 is a cross-sectional view of the first movement unit 200 according to another embodiment.

According to the embodiment shown in FIG. 8, the first guide 230 may include a second inclined surface 233 inclined with respect to the first direction X1 or the second direction X2. The second inclined surface 233 may be formed at the first end 231 of the first guide 230 and thus a degree of freedom in design may be increased such that the second movement unit 300 may move to an inner side of the second inclined surface 233.

The embodiment is applicable to all embodiments of the present specification.

Figure 9:
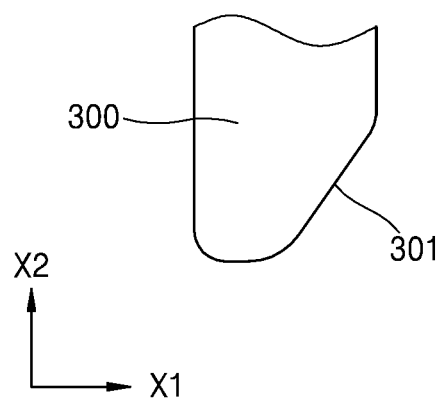
FIG. 9 is a cross-sectional view of a second movement unit according to another embodiment.

FIG. 9 is a cross-sectional view of the second movement unit 300 according to another embodiment.

According to the embodiment shown in FIG. 9, the second movement unit 300 may include a third inclined surface 301 (also referred to as a support surface). The third inclined surface 301 may be inclined with respect to the first direction X1 or the second direction X2. Preferably, the third inclined surface 301 may be formed on a portion of the second movement unit 300 adjacent to the first movement unit 200. The third inclined surface 301 contacts the first movement unit 200 or the transfer unit and receives power of the first movement unit 200. In this case, since the third inclined surface 301 is inclined, the third inclined surface 301 may more smoothly transfer power from the first movement unit 200 or the transfer unit. Also, excessive abrasion may be prevented from occurring on a power transfer surface during a repeated power transfer process.

The embodiment is applicable to all embodiments of the present specification.

Though the above embodiments have shown that the first inclined surface 211, the second inclined surface 233, and the third inclined surface 301 have linear shapes, the present disclosure is not limited thereto and at least one of the first inclined surface 211, the second inclined surface 233, and the third inclined surface 301 may be formed in the shape having a curvature. Also, at least one of the first inclined surface 211, the second inclined surface 233, and the third inclined surface 301 may have a support surface corresponding to a shape of another member contacting thereto, and a power transfer area increases due to the support surface and transfer of a fine motion may be performed smoothly and accurately.

Figure 10:
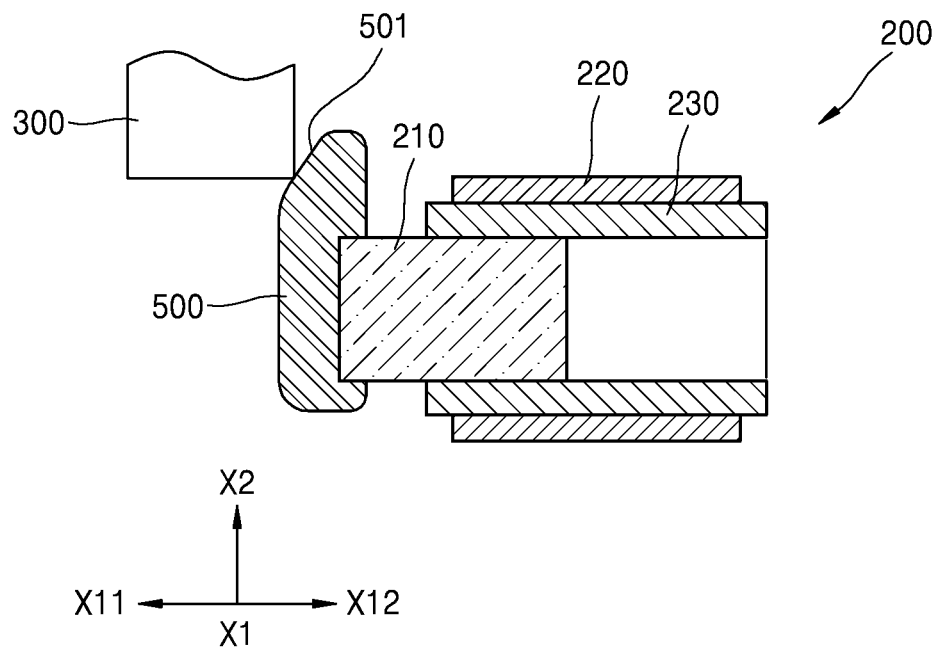
FIG. 10 is a cross-sectional view of a first movement unit and a transfer unit, according to another embodiment.

FIG. 10 is a cross-sectional view of the first movement unit 200 and a transfer unit 500 according to another embodiment.

Referring to FIG. 10, the transfer unit 500 may be arranged between the first movement unit 200 and the second movement unit 300. The transfer unit 500 is configured to transfer a motion of the first movement unit 200 to the second movement unit 300. According to the embodiment shown in FIG. 10, the transfer unit 500 may extend approximately in the second direction X2 and may be fixedly coupled to the magnet 210. Therefore, the transfer unit 500 moves in the first direction X1 due to a motion of the magnet 210 in the first direction X1, and this motion is transferred to the second movement unit 300 and thus the second movement unit 300 moves in the second direction X2.

According to an embodiment, the transfer unit 500 may include a fourth inclined surface 501 (also referred to as a support surface) adjacent to the second movement unit 300. The fourth inclined surface 501 may be inclined with respect to the first direction X1 or the second direction X2. As shown in the drawing, the fourth inclined surface 501 may be formed as a straight line-shaped flat surface but is not limited thereto and may have a curvature. The fourth inclined surface 501 contacts the second movement unit 300 and directly transfers power of the first movement unit 200 to the second movement unit 300. In this case, since the fourth inclined surface 501 is inclined, the support surface 501 may more smoothly transfer power to the second movement unit 300. Also, excessive abrasion may be prevented from occurring on a power transfer surface during a repeated power transfer process. Also, the fourth inclined surface 501 may have a support surface corresponding to a shape of another member contacting thereto, and a power transfer area increases due to the support surface and transfer of a fine motion may be performed smoothly and accurately.

Though FIG. 10 has shown that the transfer unit 500 is coupled to the first movement unit 200 of the embodiment shown in FIG. 5, the present disclosure is not limited thereto and the transfer unit 500 is applicable to the first movement unit 200 of all the embodiments of the present disclosure. In the case where the transfer unit 500 is applied to the first movement unit 200 of the embodiment shown in FIG. 6, the transfer unit 500 may be coupled to the first guide 230.

Figure 11:
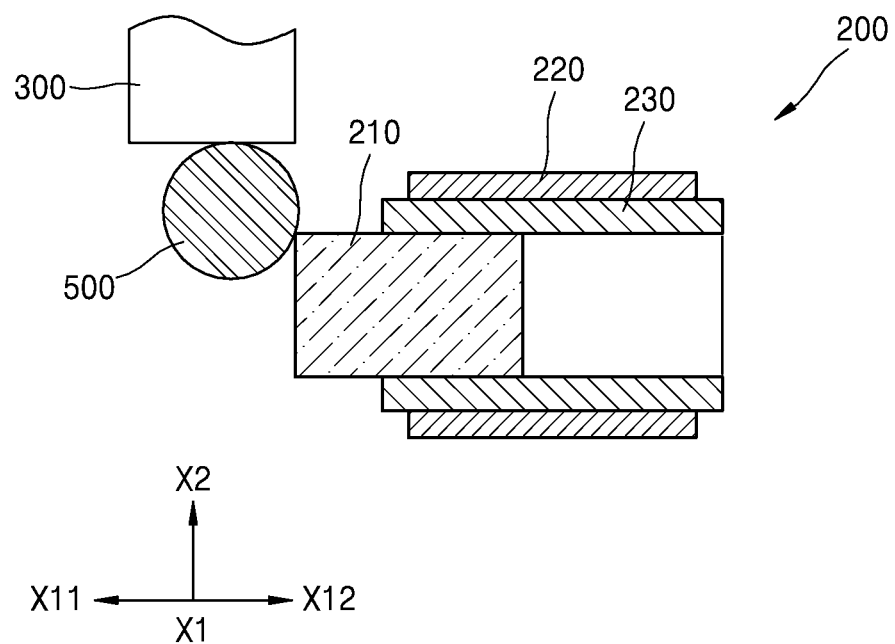
FIG. 11 is a cross-sectional view of a first movement unit and a transfer unit, according to another embodiment.

FIG. 11 is a cross-sectional view of the first movement unit 200 and the transfer unit 500 according to another embodiment.

Referring to FIG. 11, the transfer unit 500 configured to transfer a motion of the first movement unit 200 to the second movement unit 300 may be arranged between the first movement unit 200 and the second movement unit 300. According to the embodiment shown in FIG. 11, the transfer unit 500 may be separated from the first movement unit 200 and/or the second movement unit 300. The transfer unit 500 may have a spherical shape as shown in FIG. 11 and is not limited thereto and may have a spherical shape having an elliptical cross-section or may have a shape having a plurality of curvatures on a surface thereof. Also, depending on a case, the transfer unit 500 may include a polygonal surface. The transfer unit 500 of an independent shape may alleviate a transfer resistance when the motion of the first movement unit 200 is transferred to the second movement unit 300, and increase a degree of freedom in designing a member on which the first movement unit 200, the second movement unit 300, and the transfer unit 500 are mounted.

Though the embodiment shown in FIG. 11 has shown that the transfer unit 500 is coupled to the first movement unit 200 of the embodiment shown in FIG. 5, the present disclosure is not limited thereto and the transfer unit 500 is applicable to the first movement unit 200 of all the embodiments of the present disclosure.

Figure 12:
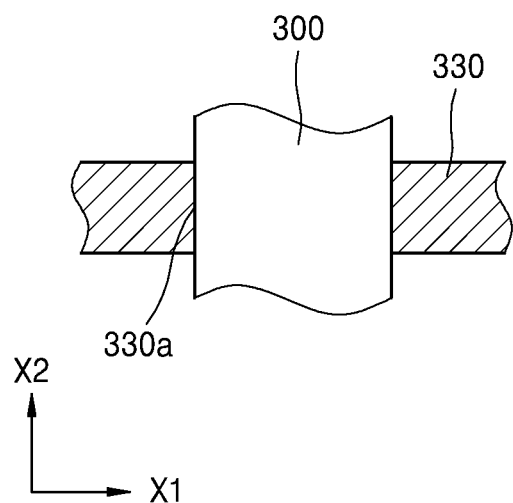
FIG. 12 is a cross-sectional view of a second movement unit according to another embodiment.

Meanwhile, as shown in FIG. 12, the information output module according to an embodiment may further include a second guide 330 configured to guide the second movement unit 300. The second guide 330 may include a second guide hole 330a therein and at least a portion of the second movement unit 300 may be located in the second guide hole 330a. The second guide hole 330a may extend in the second direction X2. Since the second movement unit 300 is guided by the second guide hole 330a to move in the second direction X2, the second movement unit 300 may move more stably without shaking.

The second guide 330 may be formed as a plate-shaped body as shown in FIG. 12 and is not limited thereto and may be formed in various shapes such as a pipe shape surrounding the second movement unit 300, a protrusion structure configured to support a portion of the second movement unit 300, etc. In the case where the second guide 330 is formed in a protrusion structure, the second guide hole 300a does not exist and the second guide 330 may support the second movement unit 300 with at least a partial surface thereof and guide the motion of the second movement unit 300.

The embodiment is applicable to all the embodiments of the present disclosure.

Figure 13:
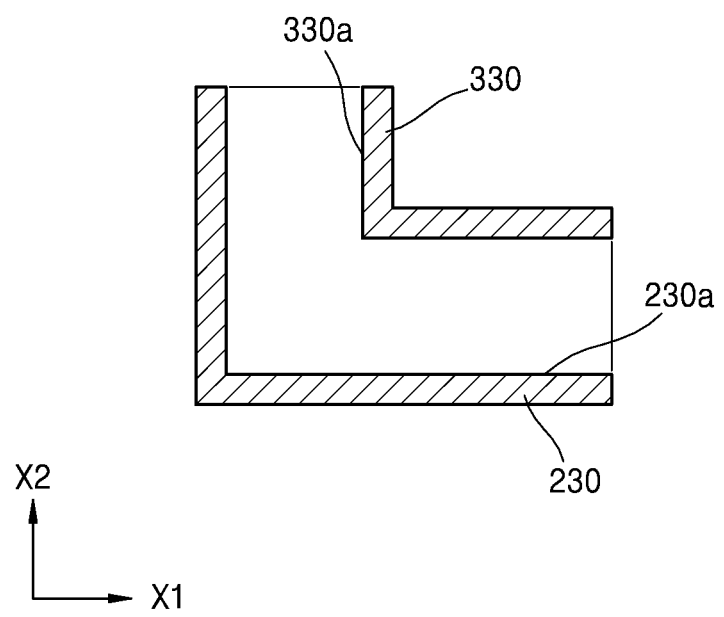
FIG. 13 is a cross-sectional view of an assembly of a first guide and a second guide, according to another embodiment.

FIG. 13 is a cross-sectional view of an assembly of the first guide 230 and the second guide 330 according to another embodiment.

Like the above embodiments, the first guide 230 includes the first guide hole 230a therein that extends in the first direction X1, and the second guide 330 includes the second guide hole 330a therein that extends in the second direction X2. In this case, the first guide 230 and the second guide 330 may be configured such that ends thereof adjacent to each other are coupled.

In the case of the guide assembly of this structure, the magnetic force member 210 may be located in the first guide hole 230a, the coil member 220 may be located on an outer side of the first guide 230, and at least a portion of the second movement unit 300 may be located in the second guide hole 330a. Therefore, a motion of the magnetic force member 210 and a motion of the second movement unit 300 may be accurately guided and a stable motion transfer may be performed.

Selectively, the transfer unit 500 may be also located inside the guide assembly. The transfer unit 500 may be located on a connection portion of the first guide 230 and the second guide 330 and is not limited thereto and may be located inside the first guide 230 or the second guide 330 depending on a design condition.

The embodiment is applicable to all the embodiments of the present disclosure.

Figure 14:
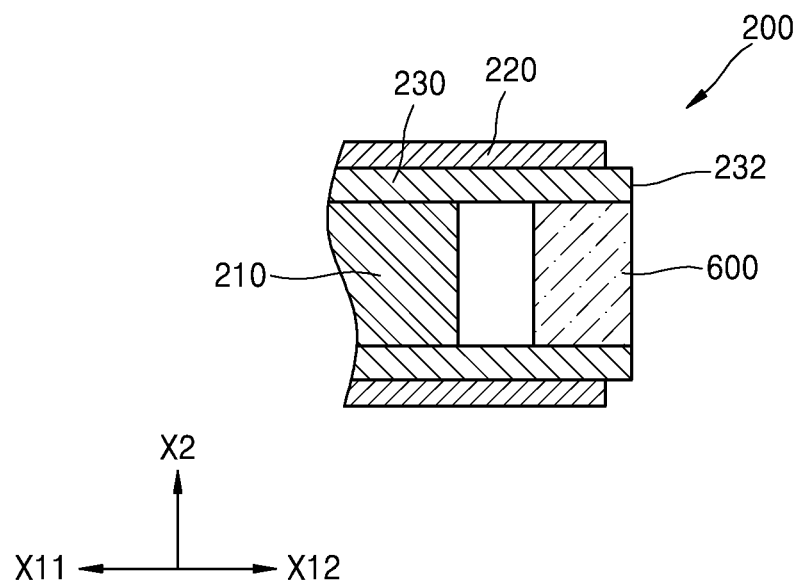
FIG. 14 is a cross-sectional view of a first movement unit according to another embodiment.

FIG. 14 is a cross-sectional view of the first movement unit 200 according to another embodiment. Referring to FIG. 14, the first movement unit 200 according to another embodiment may further include a stopper 600 located inside the first guide hole 230a. The stopper 600 may include a non-magnetic body. For example, the stopper 600 may control a motion of the magnetic force member 210 in the (1-2)nd direction X12. The stopper 600 may be formed to have the same cross-sectional area as an inner cross-sectional area of the first guide hole 230a to close a portion of the first guide hole 230a and is not limited thereto. Though not shown, the stopper 600 may be formed in a spherical shape or an elliptical spherical shape and inserted into the first guide hole 230a. Selectively, the stopper 600 may be formed as one body with the first guide 230 or may be bonded with a separate adhesive.

The embodiment is applicable to all the embodiments of the present disclosure.

Figure 15:
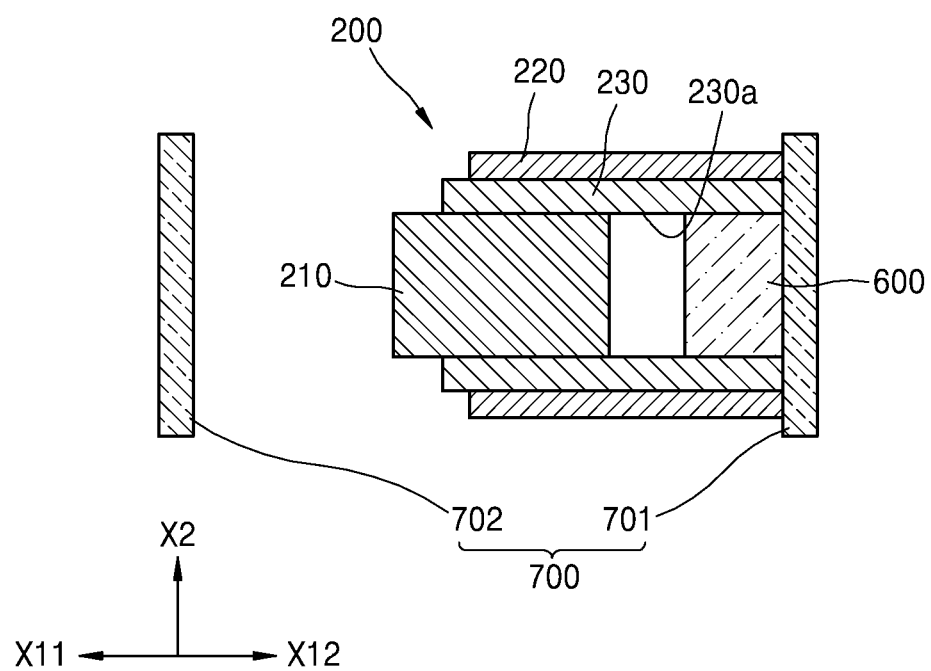
FIG. 15 is a cross-sectional view of a first movement unit and a magnetic body, according to an embodiment.

As shown in FIG. 15, the information output apparatus according to another embodiment may further include at least one magnetic body 700 facing the first movement unit 200.

According to an embodiment, the magnetic body 700 may include a first magnetic body 701 and a second magnetic body 702.

The magnetic body 700 may be provided in a plate shape and, for example, may include iron. However, the magnetic body 700 is not limited thereto and may include cobalt and/or nickel. Selectively, the magnetic body 700 may include a polymer material including a magnet material.

According to an embodiment, the second magnetic body 702 may be located at a position facing the magnetic force member 210 and spaced apart from the magnetic force member 210. Though not shown, another member may be located between the second magnetic body 702 and the magnetic force member 210, and the other member may be a stopper including a non-magnetic body. The second magnetic body 702 may be located at the front when the magnetic force member 210 moves in the (1-1)st direction X11.

When the magnetic force member 210 moves in the (1-1)st direction X11, the second magnetic body 702 generates attractive force between the magnetic force member 210 and the second magnetic body 702. Therefore, the magnetic force member 210 may be fixed at a position advanced in the (1-1)st direction X11 with power not applied to the coil member 220. Therefore, though not shown in the drawing, as mentioned in the above embodiments, since the pin 400 that has been protruded to the outside of the expression surface by a forward movement of the magnetic force member 210 in the (1-1)st direction X11 may maintain a protruded state even while power is not applied to the coil member 220, power consumption for driving the pin 400 may be minimized. A magnitude of the attractive force of the second magnetic body 702 may be different depending on a thickness, a size and/or a position of the second magnetic body 702, and a length of the stopper 600. The magnitude of the attractive force may be set by taking into account the motion of the magnetic force member 210 in the (1-2)nd direction X12.

According to an embodiment, the first magnetic body 701 may be located at a position facing the magnetic force member 210, spaced apart from the magnetic force member 210, and may be adjacent to the coil member 220. The stopper 600 may be located between the first magnetic body 701 and the magnetic force member 210.

When alternating current power is applied to the coil member 220 by the first magnetic body 701, an alternating magnetic field may occur, and due to electromotive force generated from the alternating magnetic field, force separate from magnetic force from the coil member 220 may act on the magnetic force member 210. Therefore, even in the case where the magnetic force from the coil member 220 is small, an efficient motion of the magnetic force member 210 may be obtained. To efficiently generate the alternating magnetic field, it is preferable that the coil member 220 is closely attached on the first magnetic body 701.

Also, when the magnetic force member 210 moves in the (1-2)nd direction X12, the first magnetic body 701 generates attractive force between the magnetic force member 210 and the first magnetic body 701. Therefore, the magnetic force member 210 may be fixed at a position reversed in the (1-2)nd direction X12 with power not applied to the coil member 220. A magnitude of the attractive force of the first magnetic body 701 may be different depending on a thickness, a size and/or a position of the first magnetic body 701, and a length of the stopper 600. The magnitude of the attractive force may be set by taking into account the motion of the magnetic force member 210 in the (1-2)nd direction X12.

The embodiment is applicable to all the embodiments of the present disclosure.

Figure 16A:
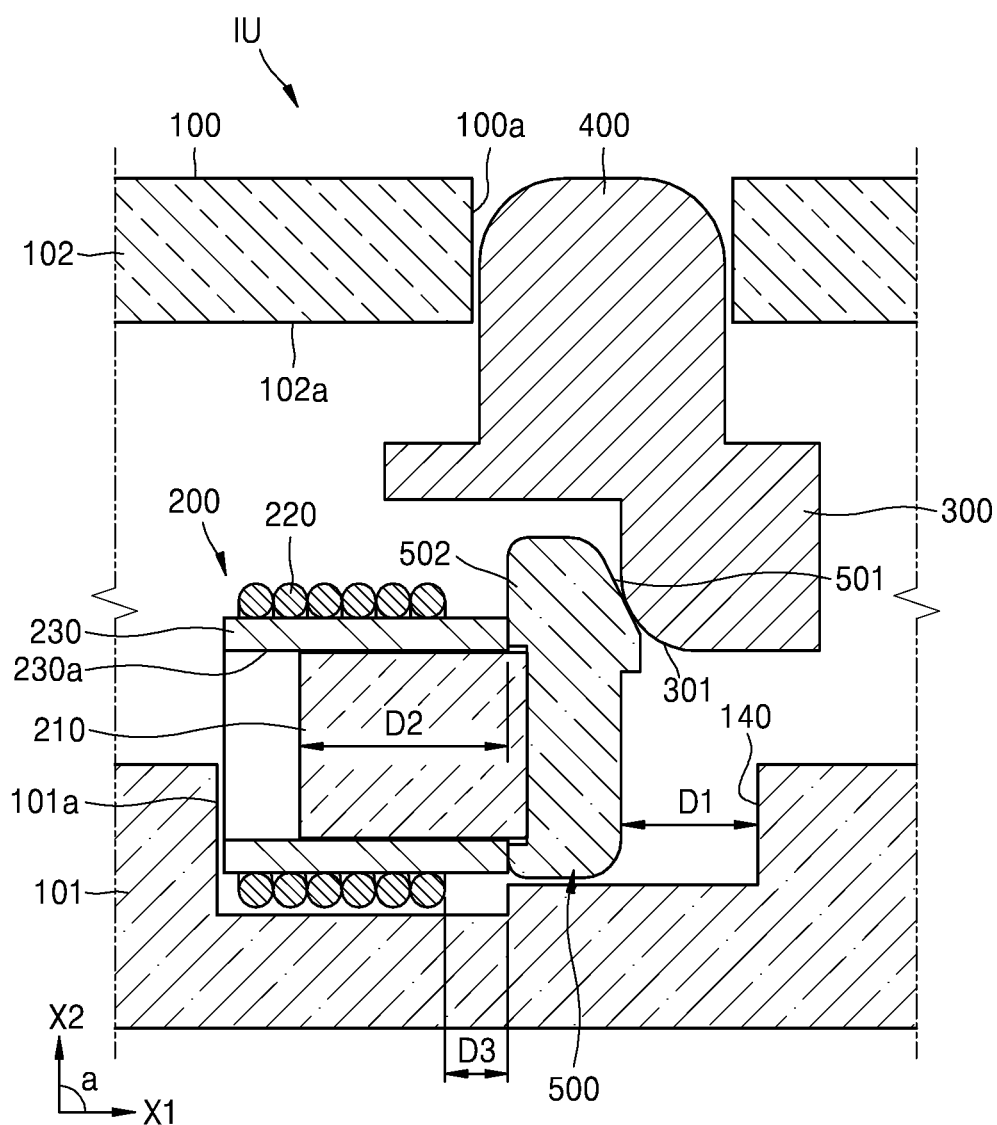
FIG. 16A is a configuration view of an information output module IU according to an embodiment and FIG. 16B is an exemplary view of a state changed from a state of FIG. 16A.
Figure 16B:
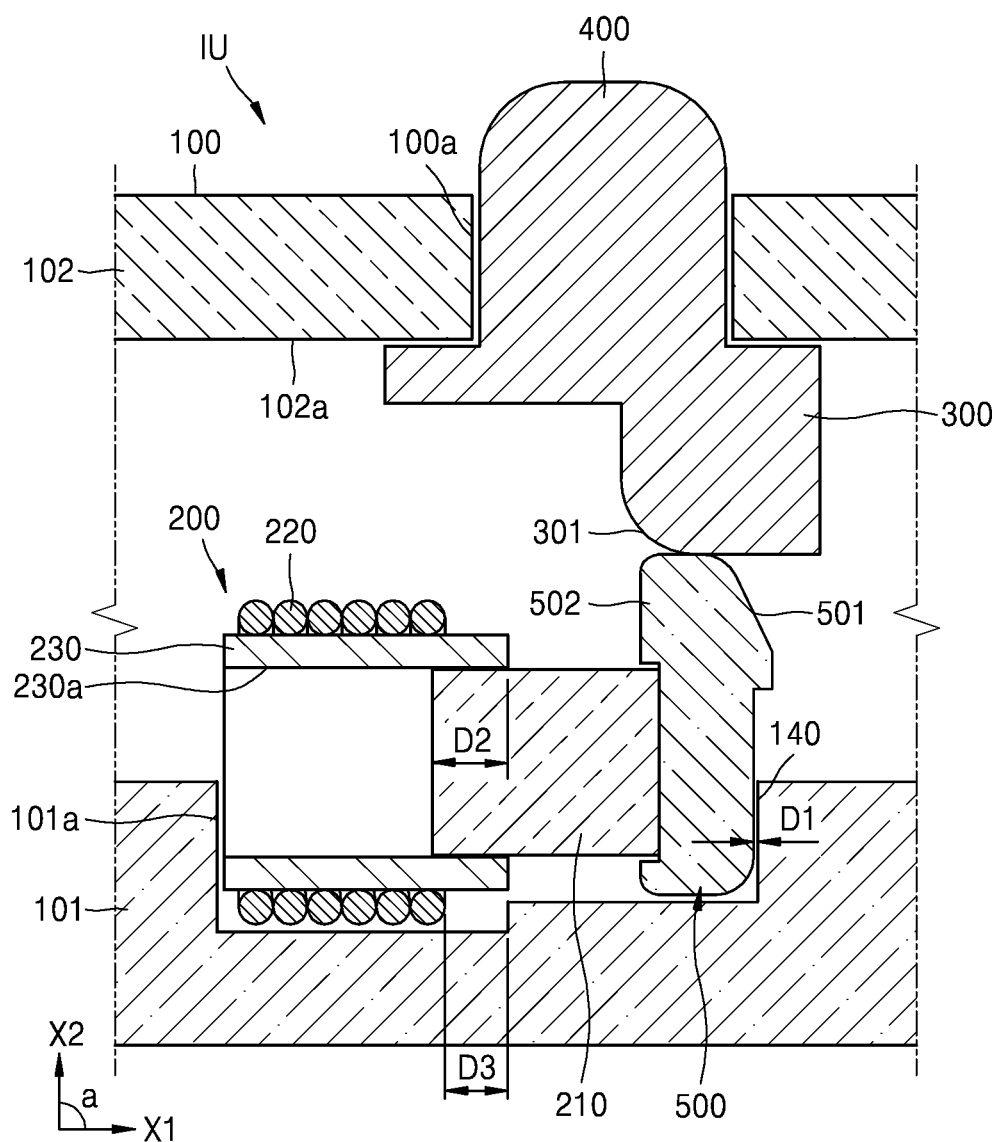

FIG. 16A is a configuration view of an information output module IU according to an embodiment and FIG. 16B is an exemplary view of a state changed from a state of FIG. 16A.

The information output module IU according to an embodiment may include the first movement unit 200, the transfer unit 500, the second movement unit 300, and the pin 400.

The first movement unit 200 may be configured such that at least a portion thereof, for example, the magnetic force member 210 or the coil member 220 including the first guide 230 performs a reciprocating motion in the first direction X1 in response to an electric signal applied thereto. The first movement unit 200 may be configured to operate according to an electromagnet principle. For this purpose, the first movement unit 200 may include at least one magnetic force member 210 and at least one coil member 220. An electric signal applied from the outside may be transferred to the coil member 220.

The second movement unit 300 may protrude in the second direction X2 different from the first direction X1 and may be configured to perform a reciprocating motion in the second direction X2. Though the embodiments shown in FIGS. 16A and 16B illustrate that the second direction X2 is a direction perpendicular to the first direction X1, that is, the first direction X1 is a horizontal direction and the second direction X2 is a vertical direction, the embodiment is not limited thereto.

The transfer unit 500 may be arranged between the first movement unit 200 and a pin 400 and may be configured to transfer driving force of the first movement unit 200 to the pin 400. Therefore, the transfer unit 500 may transfer a motion of the first movement unit 200 performing a reciprocating motion in the first direction X1 to the pin 400, and therefore, the pin 400 may move in the second direction X2 different from the first direction X1. For this purpose, the transfer unit 500 may be configured to perform a reciprocating motion in the first direction X1 according to the first movement unit 200.

In the case of the embodiment shown in FIGS. 16A and 16B, the first movement unit 200 may include the first guide 230. The first guide 230 may be formed in a pipe shape extending in the first direction X1. The first guide 230 includes the first guide hole 230a therein, and the first guide hole 230a may extend in the first direction X1. The first guide hole 230a may be a cylindrical hole having a circular cross-section and is not limited thereto and may be a polygonal hole having a polygonal cross-section. Also, the first guide hole 230a is not limited to a hole having open two opposite ends and may have a recess shape having one open end.

The coil member 220 is wound on at least a partial outer surface of the first guide 230. Though not shown in the drawing, a recess may be formed in the outer surface of the first guide 230 such that the coil member 220 is easily wound. The first guide 230 may be fixedly located in a recess 101a formed in a first base 101.

The magnetic force member 210 may be inserted into the first guide hole 230a inside the first guide 230. The magnetic force member 210 may move, guided by the first guide hole 230a and perform a reciprocating motion in the first direction X1. In the case where the information output apparatus according to an embodiment is horizontally located on the ground, the magnetic force member 210 may move with less interferences of gravity. This may contribute to allowing the pin 400 to maintain a protruded state.

One end of the magnetic force member 210 may be inserted to the first guide hole 230a of the first guide 230, and the transfer unit 500 may be coupled to another end of the magnetic force member 210. For the magnetic force member 210, a magnet having one end including an N-pole or an S-pole, and an opposite end including an opposite polarity in the first direction X1 may be used.

It is sufficient when only at least a portion of one pole of the magnetic force member 210 is inserted to the first guide 230. For example, only an N-pole or an S-pole of the magnetic force member 210 may be inserted to the first guide 230. Therefore, the magnetic force member 210 may be inserted to the first guide 230 by only half the length of the magnetic force member 210 or less. However, a degree of insertion of the magnetic force member 210 is not limited thereto and may change depending on a degree of winding of the coil member 220.

The coil member 220 may have a structure in which a direction of electromotive force may change depending on a flow direction of a current in FIGS. 16A and 16B.

Unlike the drawing, the transfer unit 500 coupled to another end of the magnetic force member 210 may be formed as one body with the magnetic force member 210. However, the transfer unit 500 does not necessarily need to include a material of the magnetic force member 210 and may include any material as far as the material may transfer driving force to the pin 400 by supporting the pin 400.

The transfer unit 500 may include an extension portion 502 extending toward the second movement unit 300. In the embodiment shown in FIGS. 16A and 16B, the extension portion 502 may extend in the second direction X2. The extension portion 502 includes a support surface 501 on an end thereof. The support surface 501 includes an inclined surface and is configured to contact the support surface 301 of the second movement unit 300. The support surface 301 may be inclined from an upper end of the second direction X2 to a direction away from the first movement unit 200. The support surface 301 may be provided as a curved surface having a predetermined curvature depending on a case.

The second movement unit 300 may be configured to move in the second direction X2 in cooperation with a motion of the first movement unit 200. The second movement unit 300 may move, subject to the motion of the first movement unit 200 and thus may not be electrically connected to an external power source and/or the control module.

The pin 400 is driven by the second movement unit 300 and may move in the third direction. The pin 400 may be coupled to the second movement unit 300 and according to an embodiment, may be formed as one body with the second movement unit 300. In this case, since the second movement unit 300 moves in the second direction X2, the third direction may be the same as the second direction X2. Therefore, the pin 400 may selectively protrude through the expression hole in the second direction X2.

However, the embodiment is not limited thereto. In the embodiment shown in FIGS. 1 and 2, at least some of the pins 400 may be separated from the second movement unit 300. In this case, the pin 400 may directly contact the second movement unit 300 which moves, or may indirectly cooperate with the motion of the second movement unit 300 in the second direction X2 through a separate link mechanism (not shown) or a separate motion transfer mechanism (not shown) with the second movement unit 300 to move in the third direction. The third direction, which is a motion direction of the pin 400, may include various directions including the second direction X2, which is the motion direction of the second movement unit 300, and the first direction X1. In this case, the third direction, which is the motion direction of the pin 400, may be a protrusion direction for implementing the above-described protrusion signal. Though embodiments of the present specification described below are based on the embodiment in which the pin 400 is coupled to the second movement unit 300, the present disclosure is not limited thereto and is equally applicable to an embodiment in which the pin 400 is separated from the second movement unit 300.

The second direction X2 may be a direction different from the first direction X1. According to the embodiment shown in FIGS. 16A and 16B, the second direction X2 may form a right angle with the first direction X1. However, the second direction X2 is not limited thereto. The first direction X1 and the second direction X2 may form a directional angle a. The directional angle a may be determined by taking into account a space in which the first movement unit 200 is arranged, a space in which the second movement unit 300 is arranged, and the third direction, which is a motion direction of the pin 400. Also, in the case where a plurality of information output modules IU are provided as in the embodiments shown in FIGS. 1 and 2, it may be set such that each information output module IU has a different directional angle or, in the case where a plurality of information output modules IU form a group, the groups respectively have different directional angles. This is equally applicable to all of the embodiments of the present specification.

Selectively, when a position of the information output apparatus changes like a case where the information output apparatus overturns, to prevent the pin 400 and/or the second movement unit 300 from protruding to the outside of the expression surface 100 with power not applied to the first movement unit 200, a separate apparatus (not shown) may be arranged between the pin 400 and/or the second movement unit 300 and an inner surface 102a of a second base 102. The apparatus may be an elastic member, and when moving force of the first movement unit 200 exceeds elastic force of the elastic member, the pin 400 may protrude to the outside of the expression surface 100. This embodiment is applicable to all the embodiments of the present specification.

The second movement unit 300 may include the support surface 301. The support surface 301 is configured to contact the support surface 501 of the transfer unit 500 and may have an inclined surface corresponding to the support surface 501 of the transfer unit 500. The inclined surface may be provided as a curved surface having a predetermined curvature. Since the support surface 301 contacts the support surface 501 of the transfer unit 500, the second movement unit 300 may move in the second direction X2. Therefore, as shown in FIGS. 16A and 16B, in the case where the transfer unit 500 moves from the left of the drawing to the right in the first direction X1, the second movement unit 300 may move from the bottom of the drawing to the top in the second direction X2.

The first movement unit 200, the transfer unit 500, the second movement unit 300, and the pin 400 may be arranged between the first base 101 and the second base 102. The predetermined recess 101a is formed in the first base 101 and the first movement unit 200 may be seated in the recess 101a. The second base 102 may face the first base 101 in the second direction X2. An external surface of the second base 102 may be the expression surface 100 and may include the expression hole 100a. However, the second base 102 is not limited thereto and a separate casing may be further provided on an outer side of the second base 102, and an outer surface of the casing may be the expression surface 100. The pin 400 is inserted to the expression hole 100a and may protrude through the expression hole 100a.

Meanwhile, a stopper 140 may be further provided at a position facing the transfer unit 500 in the first direction X1. In the embodiment shown in FIGS. 16A and 16B, the stopper 140 may be a wall of the recess 101a formed in the first base 101 that faces the transfer unit 500. The motion of the transfer unit 500 in the first direction X1 may be restrictively maintained by the stopper 140.

A maximum distance D1 between the stopper 140 and the transfer unit 500 may be shorter than a maximum distance D2 by which the magnetic force member 210 is inserted to the first guide 230. Therefore, while the magnetic force member 210 moves in the first direction X1 inside the first guide 230, the magnetic force member 210 may be prevented from being detached from the first guide 230.

Meanwhile, a predetermined interval D3 may be formed between an end of the coil member 220 that faces the transfer unit 500 and an end of the first guide 230 that faces the transfer unit 500. Therefore, when a direction of a current flowing through the coil member 220 changes and thus polarities of two opposite ends of the coil member 220 change, the magnetic force member 210 may be allowed to swiftly move in the first direction X1 due to magnetic force generated from the coil member 220.

In the information output module IU according to the above embodiment, as shown in FIGS. 16A and 16B, since a driving direction of the pin 400 and the second movement unit 300 is different from a driving direction of the first movement unit 200 and the transfer unit 500 which move the pin 400 and the second movement unit 300, the pin 400 may maintain a protruded state even after the pin 400 is protruded. In this case, even when electricity is not applied to the coil member 220, the pin 400 may maintain the protruded state. Therefore, an operation of the pin 400 may be freely performed without excessive power consumption.

Figure 17:
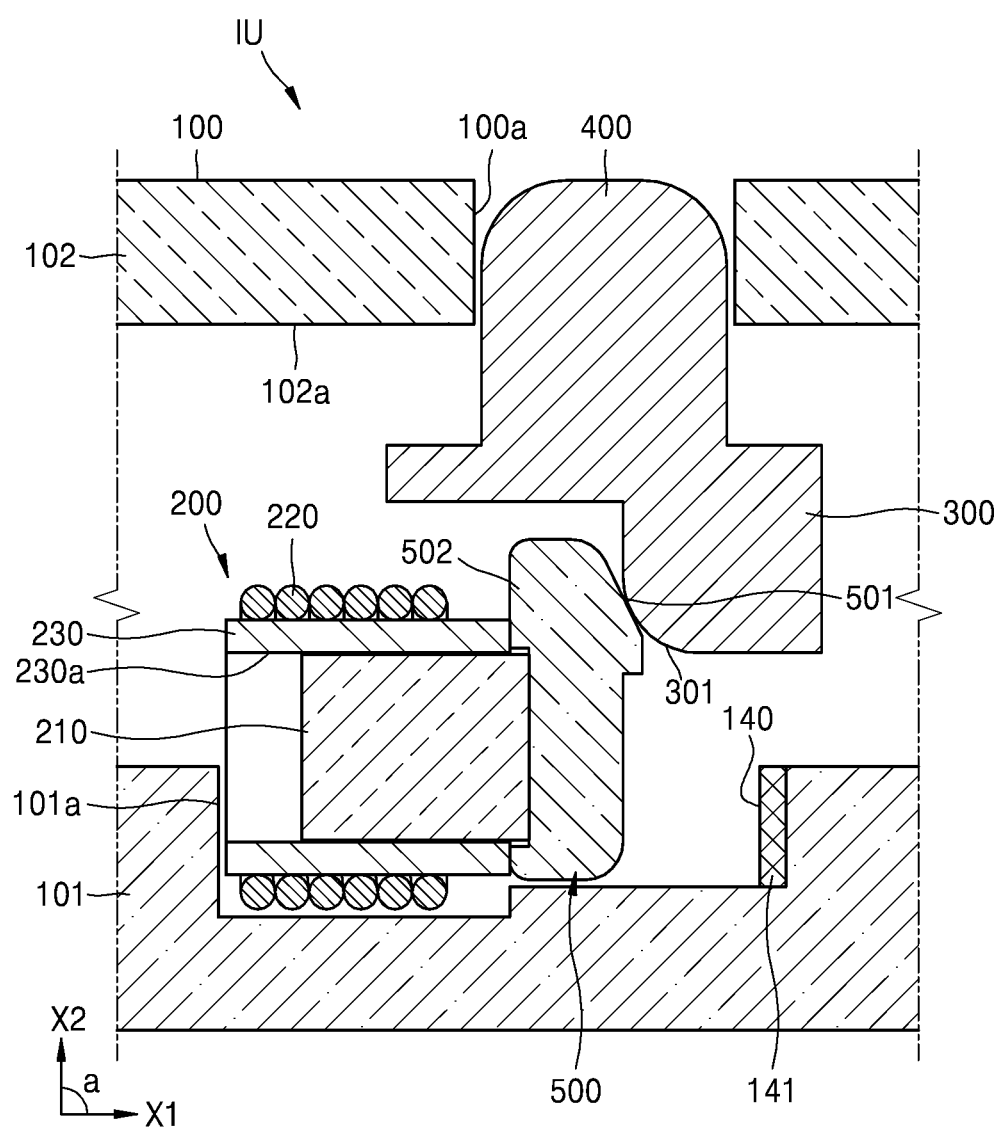
FIG. 17 is a cross-sectional view of an information output module according to another embodiment.

Meanwhile, as shown in FIG. 17, the stopper 140 may include an intermediate member 141 facing the transfer unit 500.

In an embodiment, the intermediate member 141 may prevent damages of the transfer unit 500 and/or the magnetic force member 210 and/or damage of the stopper 140 due to a contact between the transfer unit 500 and the stopper 140 when the transfer unit 500 repeatedly moves. Also, the intermediate member 141 may minimize noises.

For this purpose, the intermediate member 141 may include various materials, and for example, include an elastic material.

In an embodiment, the intermediate member 141 may include an organic material-based material.

In another embodiment, the intermediate member 141 may include an inorganic layer.

The intermediate member 141 may include a urethane-based material as an elastic material.

In an embodiment, the intermediate member 141 may include a material having excellent elasticity among silicon, rubber, and other polymers.

Figure 18:
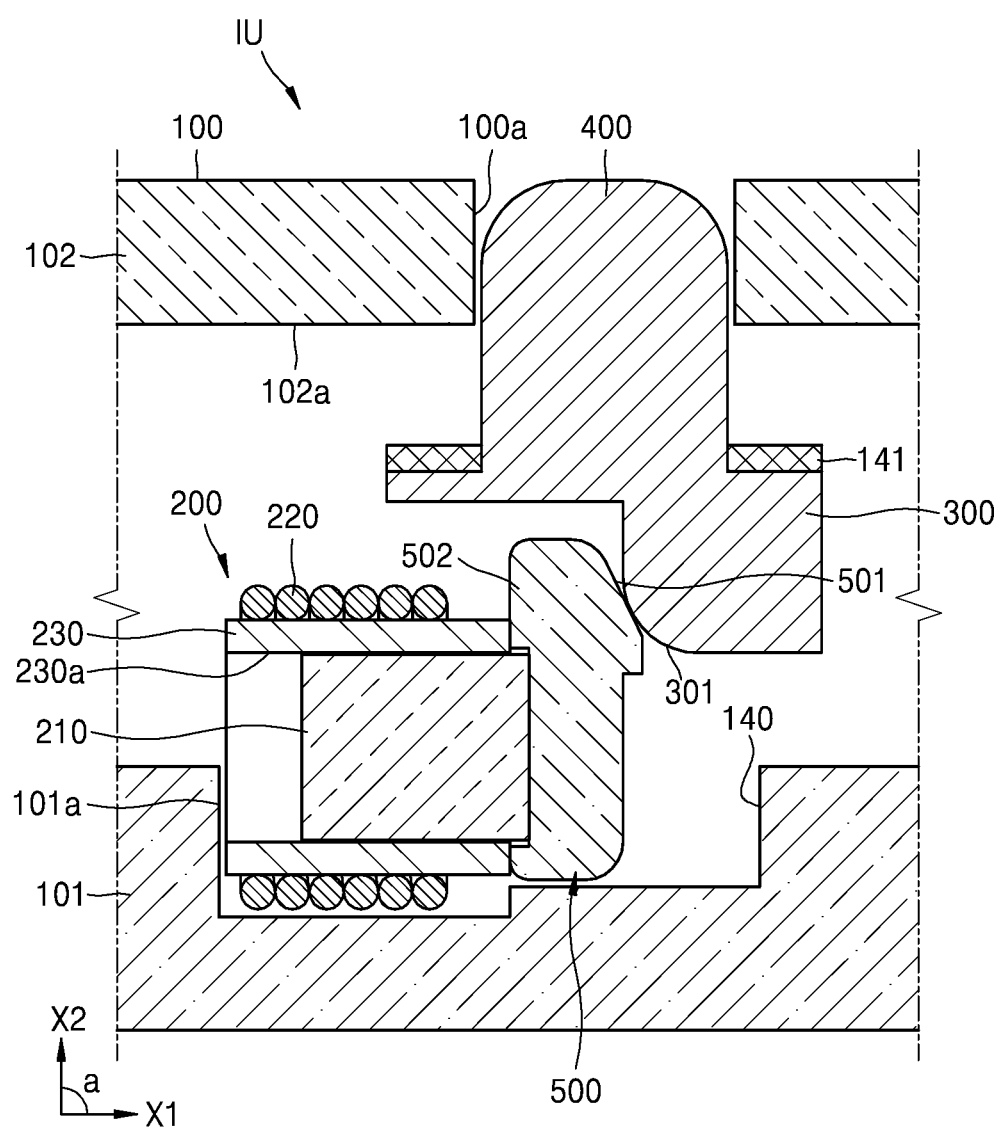
FIG. 18 is a cross-sectional view of an information output module according to another embodiment.

As shown in FIG. 18, the intermediate member 141 may be located at a portion of the second movement unit 300 adjacent to the pin 400. More specifically, the intermediate member 141 may be attached on a surface of the second movement unit 300 that faces the inner surface 102a of the second base 102 around the pin 400.

Though not shown in the drawing, in an embodiment, the intermediate member 141 may be attached on the inner surface 102a of the second base 102.

Embodiments of the intermediate member 141 are applicable to all the embodiments of the present specification.

Figure 19:
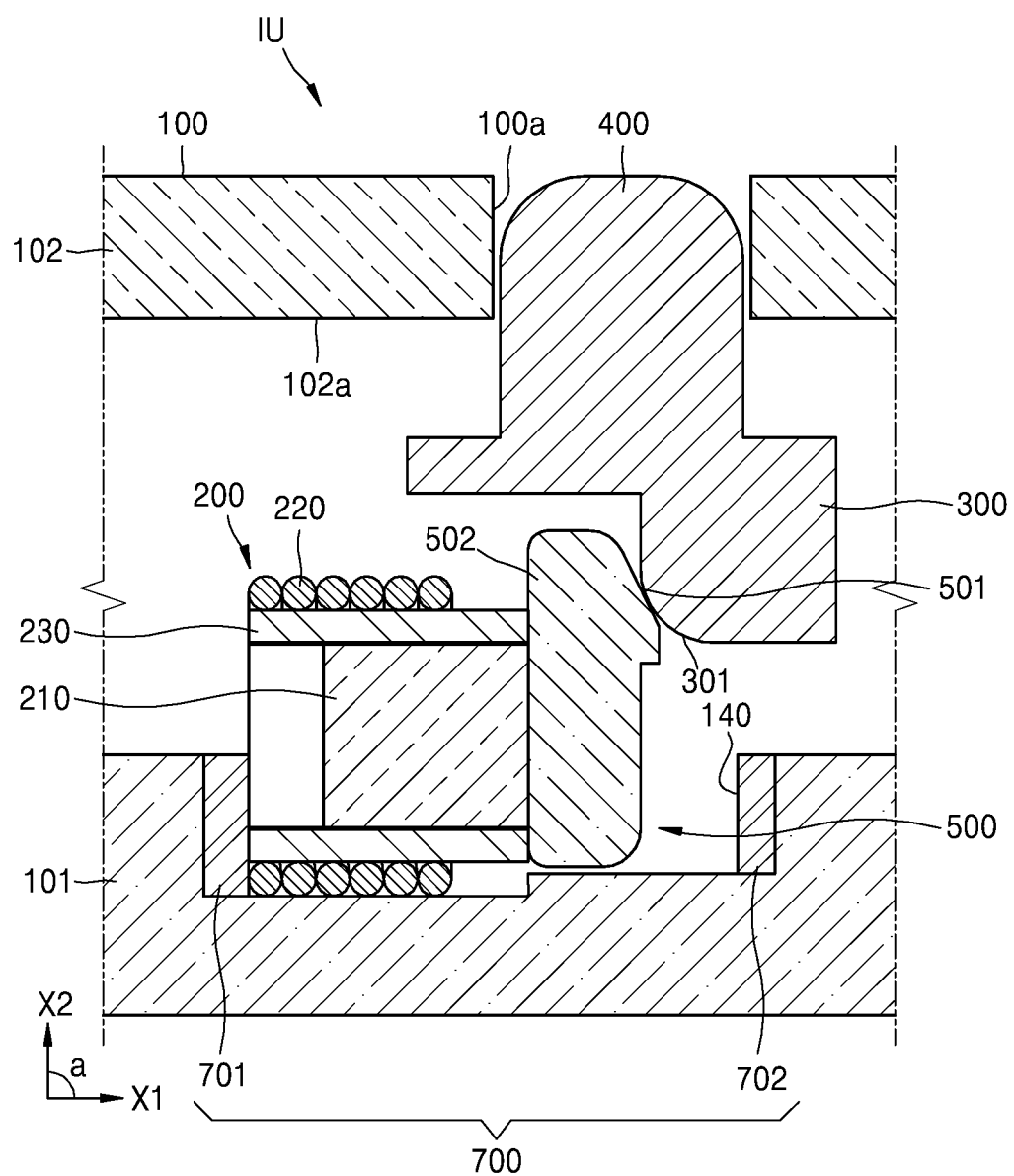
FIG. 19 is a cross-sectional view of an information output module according to another embodiment.

FIG. 19 illustrates the information output module IU according to another embodiment and the information output module IU may further include a magnetic body 700 adjacent to the magnetic force member 210.

According to an embodiment, the magnetic body 700 may include a first magnetic body 701 and a second magnetic body 702.

The magnetic body 700 may be configured in a plate shape, and for example, may include iron. However, the magnetic body 700 is not limited thereto and may include cobalt and/or nickel. Selectively, the magnetic body 700 may include a polymer material including a magnet material.

According to an embodiment, the second magnetic body 702 may be located at a position that faces the magnetic force member 210 and spaced apart from the magnetic force member 210. As shown in FIG. 19, the transfer unit 500 may be located between the second magnetic body 702 and the magnetic force member 210. In this case, the transfer unit 500 may include a non-magnetic body. The second magnetic body 702 may be located at the front when the magnetic force member 210 moves in the first direction X1.

When the magnetic force member 210 moves in the first direction X1, the second magnetic body 702 generates attractive force between the magnetic force member 210 and the second magnetic body 702. Therefore, the magnetic force member 210 may be fixed at a position advanced in the first direction X1 with power not applied to the coil member 220. Therefore, though not shown in the drawing, as mentioned in the above embodiments, since the pin 400 that has been protruded to the outside of the expression surface by a forward movement of the magnetic force member 210 in the first direction X1 may maintain a protruded state even while power is not applied to the coil member 220, power consumption for driving the pin 400 may be minimized. A magnitude of the attractive force of the second magnetic body 702 may be different depending on a thickness, a size and/or a position of the second magnetic body 702, and a length of the stopper. The magnitude of the attractive force may be set by taking into account the motion of the magnetic force member 210 in the first direction X1.

According to an embodiment, the first magnetic body 701 may be located at a position facing the magnetic force member 210, spaced apart from the magnetic force member 210, and may be adjacent to the coil member 220. Though not shown in the drawing, a stopper may be further located between the first magnetic body 701 and the magnetic force member 210.

When alternating current power is applied to the coil member 220 by the first magnetic body 701, an alternating magnetic field may occur, and due to electromotive force generated from the alternating magnetic field, force separate from magnetic force from the coil member 220 may act on the magnetic force member 210. Therefore, even in the case where the magnetic force from the coil member 220 is small, an efficient motion of the magnetic force member 210 may be obtained. To efficiently generate the alternating magnetic field, it is preferable that the coil member 220 is closely attached on the first magnetic body 701.

Also, when the magnetic force member 210 moves in the first direction X1, the first magnetic body 701 generates attractive force between the magnetic force member 210 and the first magnetic body 701. Therefore, the magnetic force member 210 may be fixed at a position reversed in the first direction X1 with power not applied to the coil member 220. A magnitude of the attractive force of the first magnetic body 701 may be different depending on a thickness, a size and/or a position of the first magnetic body 701, and a length of the stopper 600. The magnitude of the attractive force may be set by taking into account the motion of the magnetic force member 210 in the first direction X1.

The embodiment is applicable to all the embodiments of the present disclosure.

Figure 20:
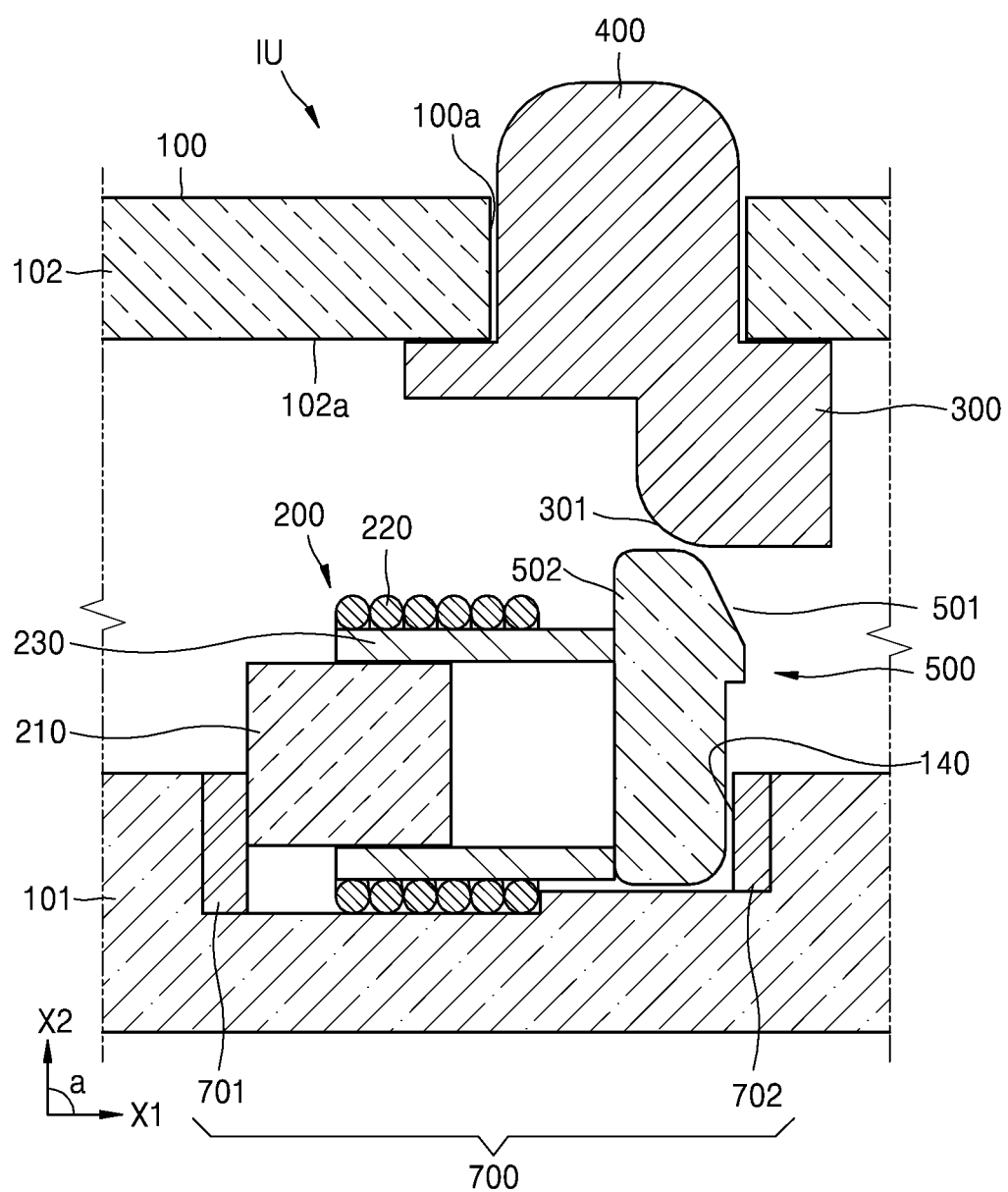
FIG. 20 is a cross-sectional view of an information output module according to another embodiment.

FIG. 20 illustrates the information output module IU according to another embodiment. Unlike the above embodiments, the first guide 230 and the coil member 220 may move in the first direction X1 with the magnetic force member 210 fixed in the first movement unit 200. In this case, the transfer unit 500 may be coupled to the first guide 230. Also, the magnetic force member 210 may contact the first magnetic body 701. A separate stopper may be further arranged between the first guide 230 and the first magnetic body 701.

As an assembly including the first guide 230 and the transfer unit 500 performs a reciprocating motion in the first direction X1, the second movement unit 300 and the pin 400 may perform a reciprocating motion in the second direction X2. Therefore, like the above embodiment, the pin 400 may maintain a protruded state even after the pin 400 is protruded. Also, even when electricity is not applied to the coil member 220, the pin 400 may maintain a protruded state. Therefore, an operation of the pin 400 may be freely performed without excessive power consumption.

Selectively, though not shown in the drawing, the above-described intermediate member may be further arranged between surfaces of the first magnetic body 701 and the second magnetic body 702 facing each other and may reduce noises and absorb an impact.

This embodiment is applicable to all the embodiments of the present specifications.

Figure 21:
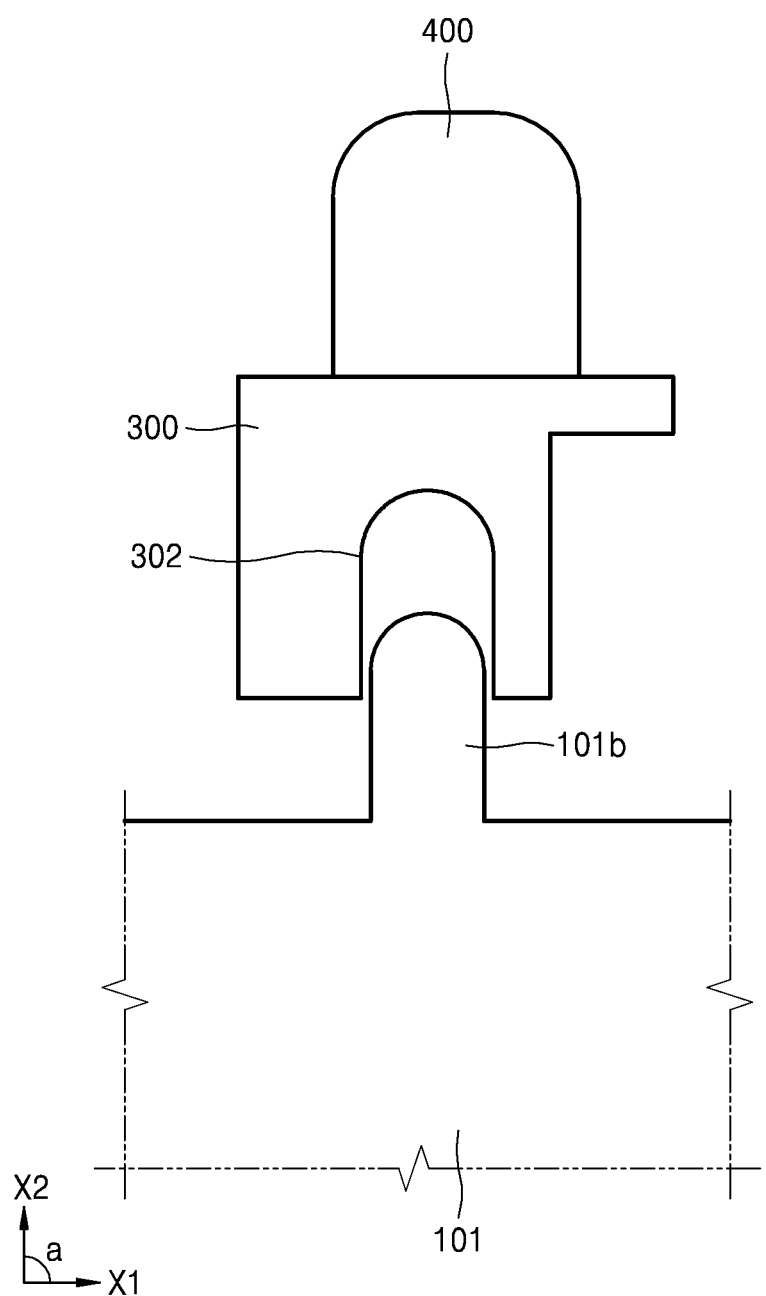
FIG. 21 is a side view of a display member according to an embodiment.

Meanwhile, as shown in FIG. 21, a guide recess 302 may be formed in the second movement unit 300. The guide recess 302 may be open toward the first base 101. The guide recess 302 may extend in a motion direction of the second movement unit 300, and for example, extend in the second direction X2.

A guide protrusion 101b may be formed at a portion of the first base 101 that faces the second movement unit 300. The guide protrusion 101b may extend in the motion direction of the second movement unit 300 and may extend in the second direction X2.

The guide protrusion 101b may be coupled to the guide recess 302, and thus the second movement unit 300 may be guided by the guide protrusion 101b to perform a reciprocating motion in the second direction X2.

The guide recess 302 and the guide protrusion 101b are applicable to all the embodiments of the present specification.

Figure 22A:
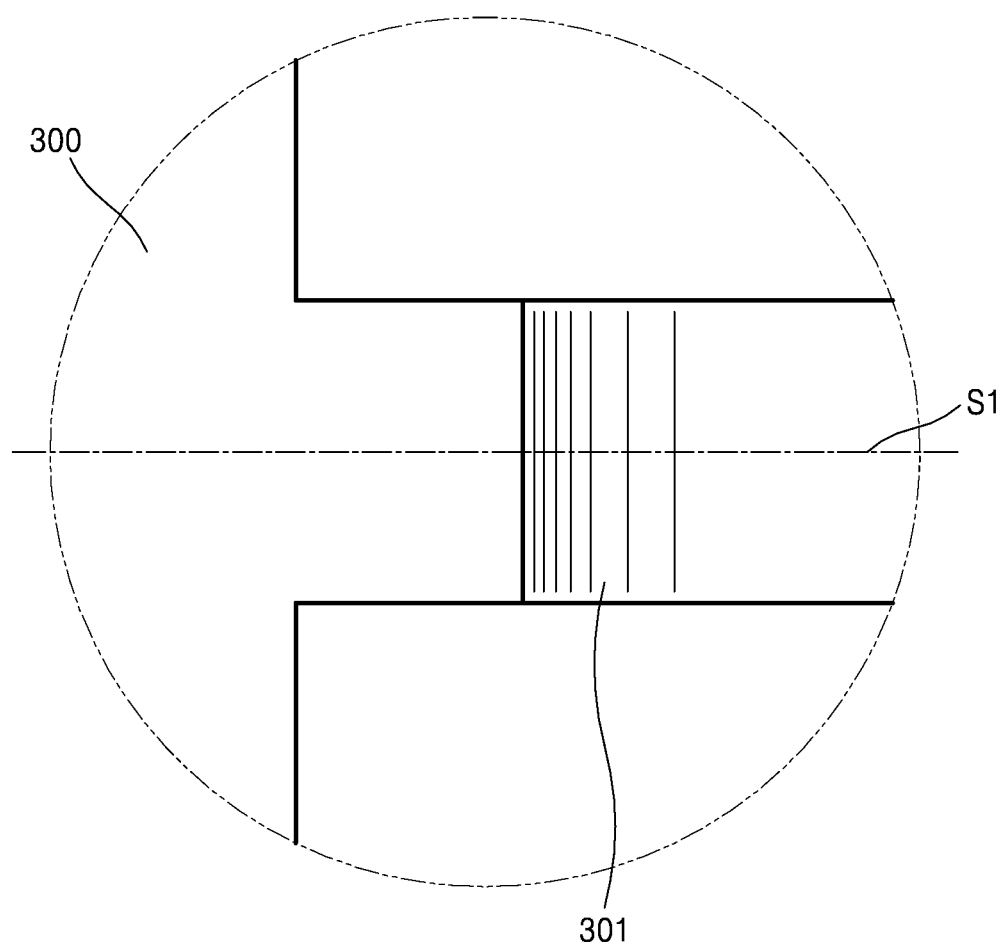
FIGS. 22A and 22B are backside views of a display member according to different embodiments.

Meanwhile, as shown in FIG. 22A, the support surface 301 formed in the second movement unit 300 may be aligned with a first central line S1 connecting a center of the pin 400. That is, a center of the support surface 301 may coincide with a center of the first central line S1. However, the support surface 301 is not limited thereto and may be located offset with respect to the first central line S1. That is, as shown in FIG. 22B, the center of the support surface 301 may be shifted from the first central line S1 in a direction perpendicular to the first direction X1.

Figure 23:
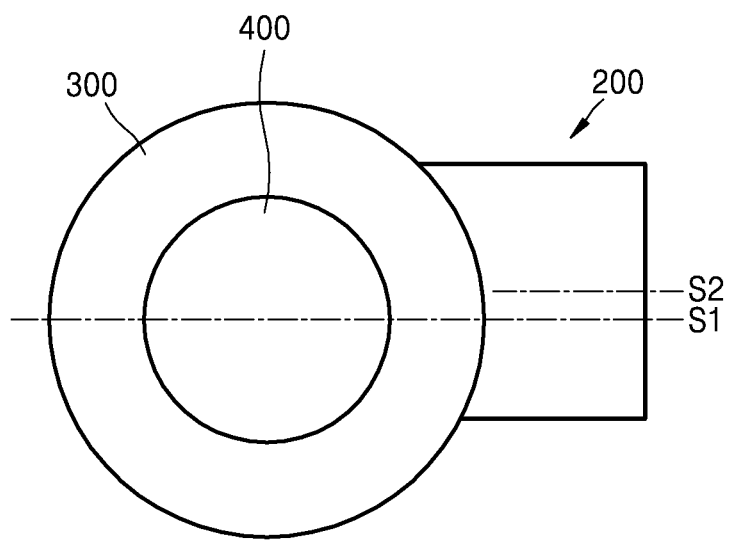
FIG. 23 is a plan view of a display member and a driving module coupled to each other, according to an embodiment.

Therefore, in another embodiment shown in FIG. 23, a second central line S2 connecting a center of the first movement unit 200 may be shifted to one side with respect to the first central line S1 connecting the center of the pin 400.

Figure 22B:
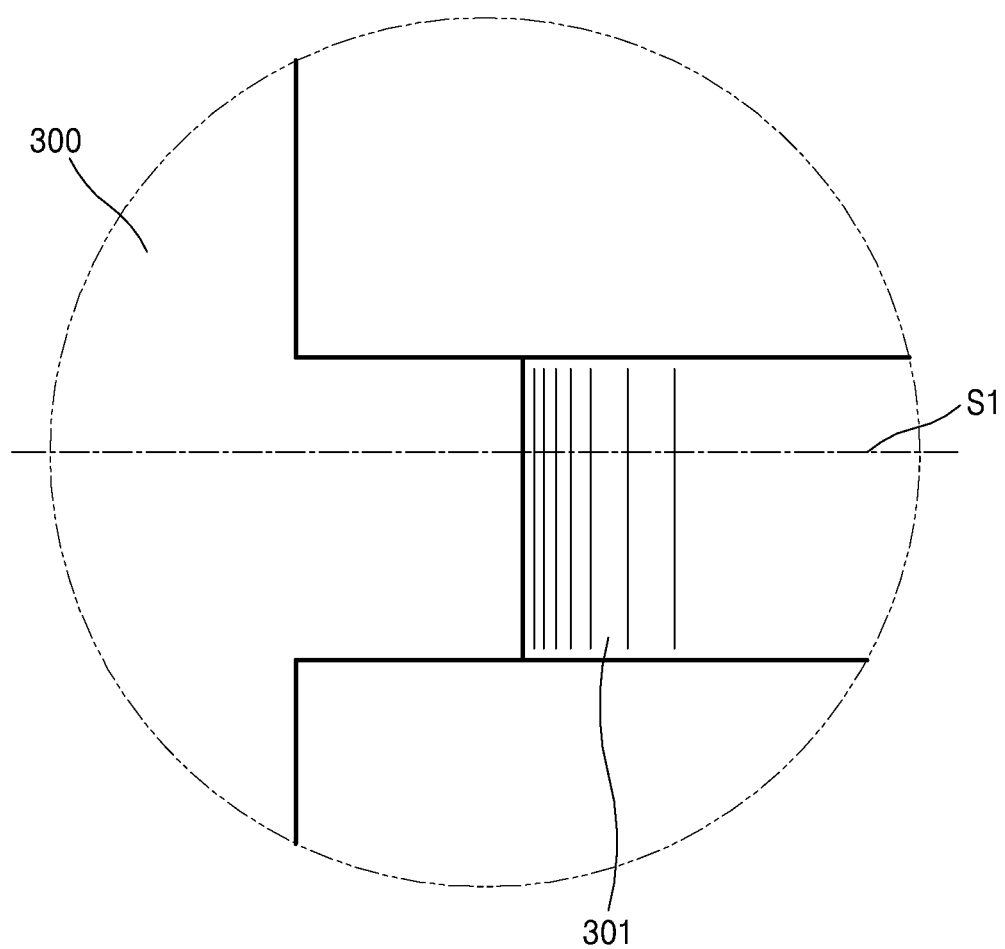

In the embodiment shown in FIGS. 22B and/or 23, in the case where a plurality of information output modules are adjacent to each other in the first direction X1, driving modules of the information output modules adjacent to each other in the first direction X1 may be prevented from generating magnetic field-interferences and causing an error in their operations.

The embodiments for the support surface 301 are applicable to all the embodiments of the present specification.

The information output module according to the embodiments may output tactile information to a user through the pin, and in an embodiment, in the case where a plurality of information output modules are provided, the information output modules may output various pieces of tactile information to a user.

For example, the information output module may provide a tactile sense type information output by sensing a protrusion of the pin 400 through a sense of touch, and particularly, provide an information output of a braille output form.

Figure 24:
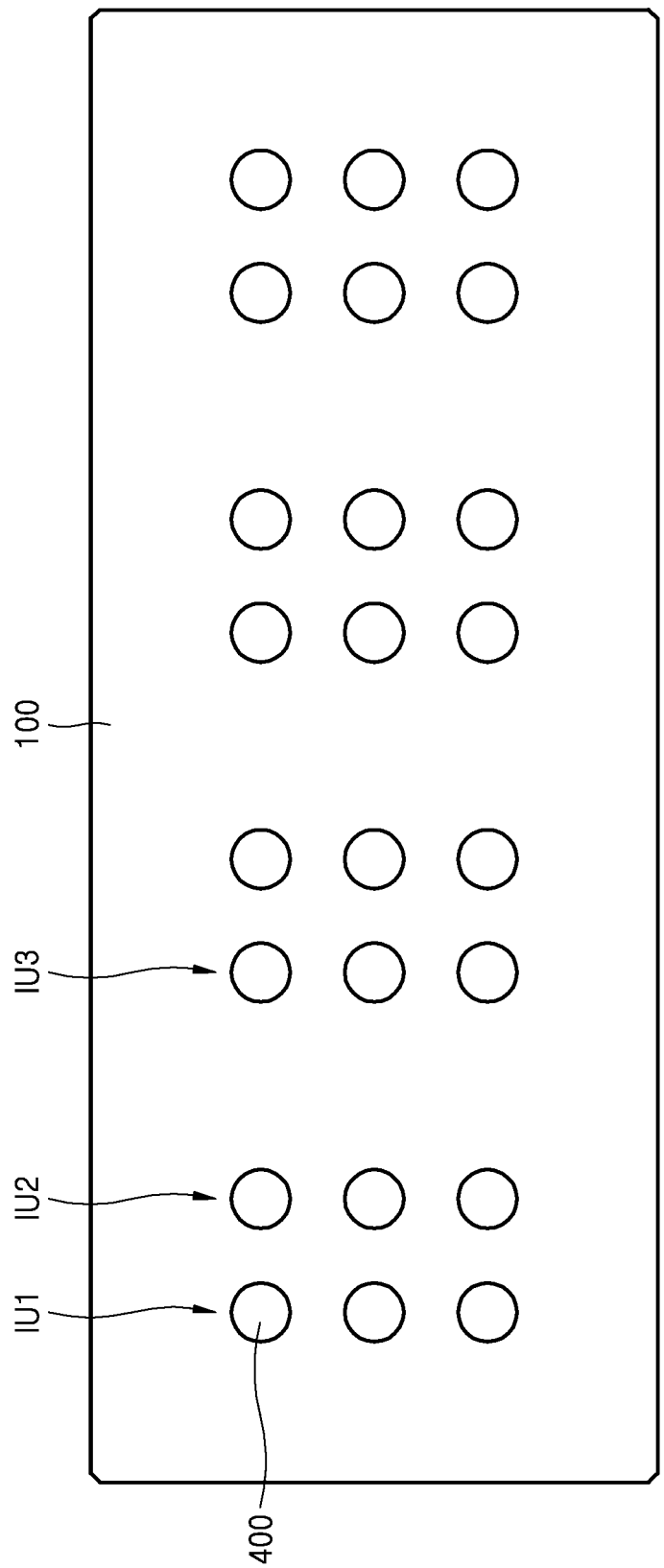
FIG. 24 is a plan view of a Braille display device displaying Braille, as an information output apparatus, according to another embodiment.

FIG. 24 illustrates a braille display device displaying braille as an information output apparatus according to another embodiment. The braille display device shown in FIG. 24 may include a plurality of information output modules IU1, IU2, IU3, . . . Six information output modules may form one set and the braille display device may include a plurality of these sets. Though the embodiment shown in FIG. 11 illustrates that one set includes a total of six information output modules, the embodiment is not limited thereto and one set may include a plurality of information output modules, for example, eight information output modules.

Figure 25A:
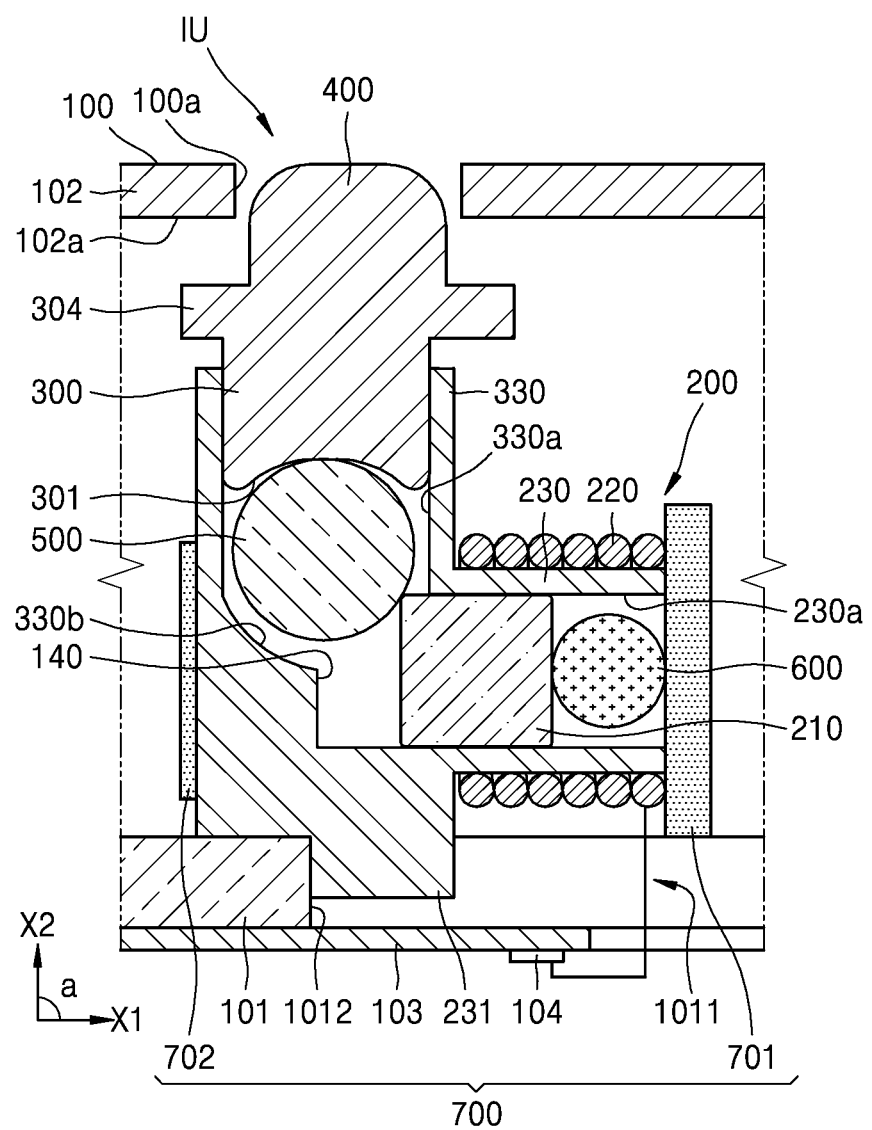
FIG. 25A is a configuration view of an information output module IU according to an embodiment.
Figure 25B:
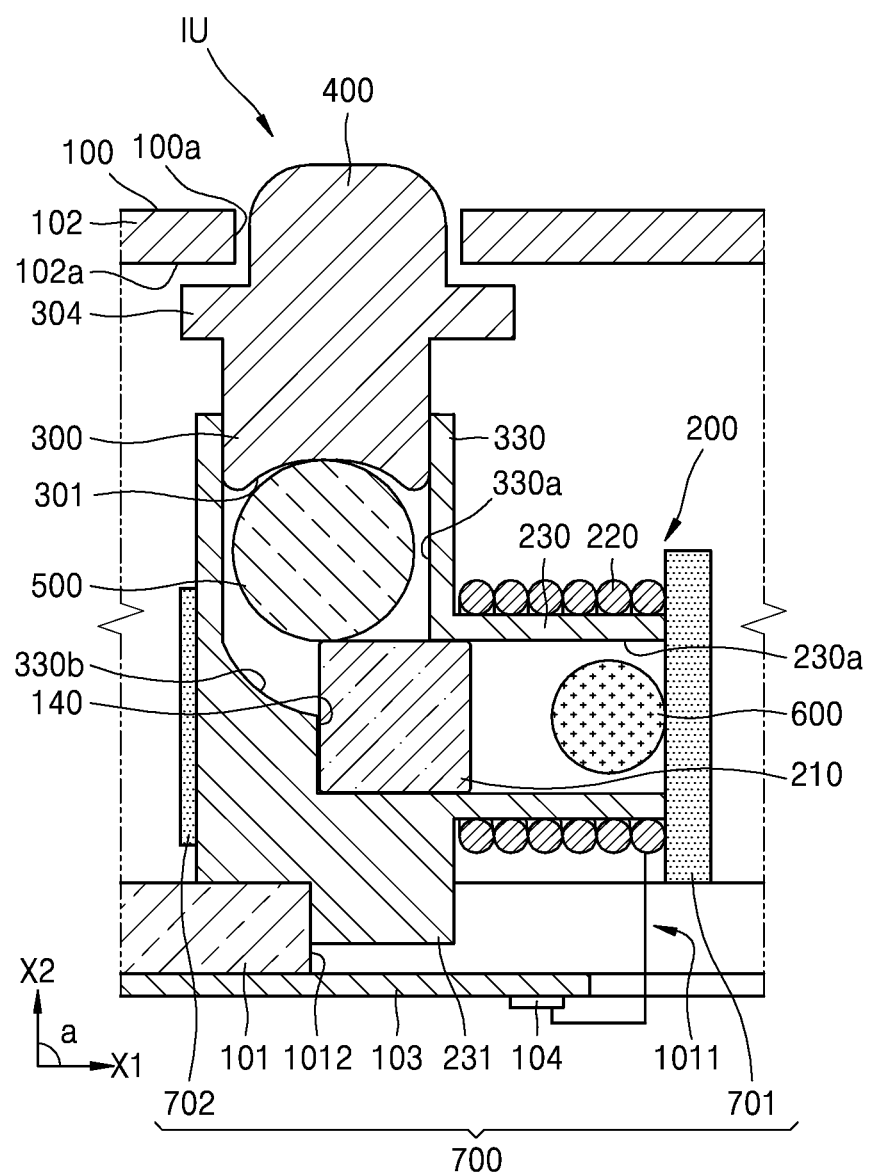
FIG. 25B is an exemplary view of a state changed from a state of FIG. 25A.

FIG. 25A is a configuration view of the information output module IU according to an embodiment, and FIG. 25B is an exemplary view of a state changed from a state of FIG. 25A.

The information output module IU according to an embodiment may include the first movement unit 200, the transfer unit 500, the second movement unit 300, and the pin 400.

The first movement unit 200 may be configured such that a portion thereof, for example, the magnetic force member 210 performs a reciprocating motion in the first direction in response to an electric signal applied thereto. The first movement unit 200 may be configured to operate according to an electromagnet principle. For this purpose, the first movement unit 200 may include at least one magnetic force member 210 and at least one coil member 220. An electric signal applied from the outside may be transferred to the coil member 220.

The second movement unit 300 may protrude in the second direction X2 different from the first direction X1 and may be configured to perform a reciprocating motion in the second direction X2. Though the embodiments shown in FIGS. 3A and 3B illustrate that the second direction X2 is a direction perpendicular to the first direction X1, that is, the first direction X1 is a horizontal direction and the second direction X2 is a vertical direction, the embodiment is not limited thereto.

The transfer unit 500 configured to transfer a motion of the first movement unit 200 to the second movement unit 300 may be further arranged between the first movement unit 200 and the second movement unit 300. The transfer unit 500 may have a spherical shape and is not limited thereto and may have a spherical shape having an elliptical cross-section or a shape having a plurality of curvatures on a surface thereof. Also, depending on a case, the transfer unit 500 may include a polygonal surface. The transfer unit 500 of the independent shape may alleviate a transfer resistance when the motion of the first movement unit 200 is transferred to the second movement unit 300, and increase a degree of freedom in designing a member on which the first movement unit 200, the second movement unit 300, and the transfer unit 500 are mounted.

An embodiment shown in FIGS. 25A and 25B may include a guide assembly of the first guide 230 and the second guide 330.

The first guide 230 includes the first guide hole 230a therein extending in the first direction X1, and the second guide 330 includes the second guide hole 330a therein extending in the second direction X2. In this case, the first guide 230 and the second guide 330 may be configured such that ends of the first guide 230 and the second guide 330 adjacent to each other are coupled.

The first guide 230 may be formed in a pipe shape extending in the first direction X1. The first guide 230 is configured to include the first guide hole 230a therein, and the first guide hole 230a may extend in the first direction X1. The first guide hole 230a may be a cylindrical hole having a circular cross-section and is not limited thereto and may be a polygonal hole having a polygonal cross-section. Also, the first guide hole 230a is not limited to a hole having open two opposite ends and may have a recess shape having one open end.

The coil member 220 is wound on at least a partial outer surface of the first guide 230. Though not shown in the drawing, a recess may be formed in the outer surface of the first guide 230 such that the coil member 220 is easily wound. The first guide 230 may be fixedly located in the recess 101a formed in the first base 101.

The magnetic force member 210 may be inserted into the first guide hole 230a inside the first guide 230. The magnetic force member 210 may move, guided by the first guide hole 230a and perform a reciprocating motion in the first direction X1. In the case where the information output apparatus according to an embodiment is horizontally located on the ground, the magnetic force member 210 may move with less interferences of gravity. This may contribute to allowing the pin 400 to maintain a protruded state.

At least a portion of the second movement unit 300 may be located in the second guide hole 330a. Therefore, the motion of the magnetic force member 210 and the motion of the second movement unit 300 may be accurately guided and a stable motion transfer may be performed.

The transfer unit 500 may be also located inside the guide assembly. The transfer unit 500 may be located in a connection portion of the first guide 230 and the second guide 330 and is not limited thereto and may be located inside the first guide 230 or the second guide 330 depending on a design condition. According to the embodiment shown in FIGS. 25A and 25B, the transfer unit 500 may be located inside the second guide 330. The connection portion of the first guide 230 and the second guide 330 that is inside the second guide may include a support surface 330b corresponding to an outer surface shape of the transfer unit 500 and support the outer surface of the transfer unit 500 adjacent thereto.

A first fixing portion 231 may be located at a lower end of the first guide 230 in the second direction X2, and the first fixing portion 113 may be inserted to a second fixing portion 1012 formed in the first base 101 to fix the first guide 230 in the first base 101. According to an embodiment, the second fixing portion 1012 may be formed in a hole shape.

The magnetic force member 210 may perform a reciprocating motion along the first guide 230 and may move and push the transfer unit 500. For this purpose, since the first stopper 140 is located at one end of the first guide 230, and the magnetic force member 210 moves to the first stopper 140, as shown in FIG. 25B, the magnetic force member 210 pushes the transfer unit 500. In the embodiment shown in FIGS. 25A and 25B, the first stopper 140 may be located between the first guide 230 and the second guide 330 and may serve as a wall facing the magnetic force member 210. The motion of the transfer unit 500 in the second direction X2 may be restrictively maintained by the first stopper 140.

The second movement unit 300 may be configured to move in the second direction X2 in cooperation with the motion of the first movement unit 200. The second movement unit 300 may move, subject to the motion of the first movement unit 200. Therefore, the second movement unit 300 may not be electrically connected to an external power source and/or the control module.

The pin 400 is driven by the second movement unit 300 and may move in a third direction. The pin 400 may be coupled to the second movement unit 300, and according to an embodiment, the pin 400 may be formed as one body with the second movement unit 300. In this case, since the second movement unit 300 moves in the second direction, the third direction may be the same as the second direction X2. Therefore, the pin 400 may selectively protrude through the expression hole in the second direction X2.

However, the present disclosure is not limited thereto and in the embodiment shown in FIGS. 1 and 2, at least some of the pins 400 may be separated from the second movement unit 300. In this case, the pin 400 may directly contact the second movement unit 300, or may be indirectly connected with the second movement unit 300 and cooperate with the motion of the second movement unit 300 in the second direction X2 through a separate link mechanism (not shown) or a separate motion transfer mechanism (not shown) with the second movement unit 300 to move in the third direction. The third direction, which is a motion direction of the pin 400, may include various directions including the second direction X2, which is the motion direction of the second movement unit 300, and the first direction X1. In this case, the third direction, which is the motion direction of the pin 400, may be a protrusion direction for implementing the above-described protrusion signal. Though embodiments of the present specification are based on the embodiment in which the pin 400 is coupled to the second movement unit 300, the present disclosure is not limited thereto and is equally applicable to the embodiment in which the pin 400 is separated from the second movement unit 300.

A flange 304 may be further located around a boundary between the second movement unit 300 and the pin 400. The flange 304 may serve as a stopper by contacting the inner surface 102a of the second base 102 when an assembly of the pin 400 and the second movement unit 300 moves in the second direction X2.

The second movement unit 300 may include the support surface 301. The support surface 301 is configured to contact the transfer unit 500 and may have an inclined surface corresponding to a surface of the transfer unit 500. The inclined surface may be provided as a curved surface having a predetermined curvature. Since the support surface 301 contacts the transfer unit 500, the second movement unit 300 may move in the second direction X2.

The first movement unit 200, the transfer unit 500, the second movement unit 300, and the pin 400 may be arranged between the first base 101 and the second base 102.

The first base 101 may include a first through hole 1011 formed in a position corresponding to a portion of the coil member 112. According to an embodiment, the first through hole 1011 may communicate with the second fixing portion 1012 and is not limited thereto and the first through hole 1011 and the second fixing hole 1012 may be respectively formed as separate holes.

A hole 100a may be formed in the second base 102 such that the pin 400 is located inside the hole 100a.

A board 103 facing the first base 101 and including a wiring unit 104 electrically connected with the coil member 112 through the first through hole 1011 may be located outside the first base 101. The board 103 may be a flexible printed circuit board, and the wiring unit 104 may be located inside the board 103.

In the information output module IU according to the embodiment, as shown in FIGS. 25A and 25B, since a driving direction of the pin 400 and the second movement unit 300 is different from a driving direction of the first movement unit 200 moving the pin 400 and the second movement unit 300, the pin 400 may maintain a protruded state after the pin 400 is protruded. In this case, even when electricity is not applied to the coil member 220, the pin 400 may maintain a protruded state. Therefore, an operation of the pin 400 may be freely performed without excessive power consumption.

Selectively, according to an embodiment, the information output apparatus may further include the magnetic body 700 facing the magnetic force member 210 in the first direction X1.

According to an embodiment, the magnetic body 700 may include the first magnetic body 701 and the second magnetic body 702.

According to an embodiment, the second magnetic body 702 may be located at a position facing the magnetic force member 210 and spaced apart from the magnetic force member 210. As shown in FIGS. 25A and 25B, the transfer unit 500 and/or the assembly of the first guide 230 and the second guide 330 may be located between the second magnetic body 702 and the magnetic force member 210 and may include a non-magnetic body. The stopper 140 may be located between the second magnetic body 702 and the magnetic force member 210. The second magnetic body 702 may be located at the front when the magnetic force member 210 moves in the first direction X1.

When the magnetic force member 210 moves in the first direction X1, the second magnetic body 702 generates attractive force between the magnetic force member 210 and the second magnetic body 702 and thus the magnetic force member 210 may be fixed at a position advanced in the first direction X1 with power not applied to the coil member 220. Therefore, though not shown in the drawing, as mentioned in the above embodiments, since the pin 400 that has been protruded to the outside of the expression surface by a forward movement of the magnetic force member 210 in the first direction X1 may maintain a protruded state even while power is not applied to the coil member 220, power consumption for driving the pin 400 may be minimized. A magnitude of the attractive force of the second magnetic body 702 may be different depending on a thickness, a size and/or a position of the second magnetic body 702, and a length of the stopper. The magnitude of the attractive force may be set by taking into account the motion of the magnetic force member 210 in the first direction X1.

According to an embodiment, the first magnetic body 701 may be located at a position facing the magnetic force member 210, spaced apart from the magnetic force member 210, and may be adjacent to the coil member 220. Also, a second stopper 600 may be further located between the first magnetic body 701 and the magnetic force member 210.

When alternating current power is applied to the coil member 220 by the first magnetic body 701, an alternating magnetic field may occur, and due to electromotive force generated from the alternating magnetic field, force separate from magnetic force from the coil member 220 may act on the magnetic force member 210. Therefore, even in the case where the magnetic force from the coil member 220 is small, an efficient motion of the magnetic force member 210 may be obtained. According to an embodiment, to efficiently generate the alternating magnetic field, it is preferable that the coil member 220 is closely attached on the first magnetic body 701.

Also, when the magnetic force member 210 moves in the first direction X1, the first magnetic body 701 generates attractive force between the magnetic force member 210 and the first magnetic body 701. Therefore, the magnetic force member 210 may be fixed at a position reversed in the first direction X1 with power not applied to the coil member 220. A magnitude of the attractive force of the first magnetic body 701 may be different depending on a thickness, a size and/or a position of the first magnetic body 701, and a length of the second stopper 600. The magnitude of the attractive force may be set by taking into account the motion of the magnetic force member 210 in the first direction X1.

Meanwhile, the second stopper 600 may include a non-magnetic body, and according to an embodiment, may include a silicon material. Moving of the magnetic force member 210 toward the first magnetic body 701 in the first direction X1 may be limited by the second stopper 600. Therefore, a problem that the magnetic force member 210 sticks on the first magnetic body 701 due to the magnetic force may be resolved. In the case where the magnetic force member 210 sticks on one end of the first magnetic body 701 including a magnetic body, the magnetic force member 210 is difficult to separate again, and a voltage applied to the coil member 220 in order to separate the magnetic force member 210 should be raised. However, since the movement of the magnetic force member 210 is limited by the second stopper 600, a voltage for moving the magnetic force member 210 may be lowered.

According to an embodiment, as shown in FIGS. 25A and 25B, the second stopper 600 may be formed in a spherical shape, and since an area of the second stopper 600 that contacts the magnetic force member 210 and/or an area of the second stopper 600 that contacts the first magnetic body 701 may be minimized, noises due to the contact may be reduced, and an influence of the motion of the magnetic force member 210 may be minimized.

This embodiment is applicable to all the embodiments of the present specifications.

Figure 26:
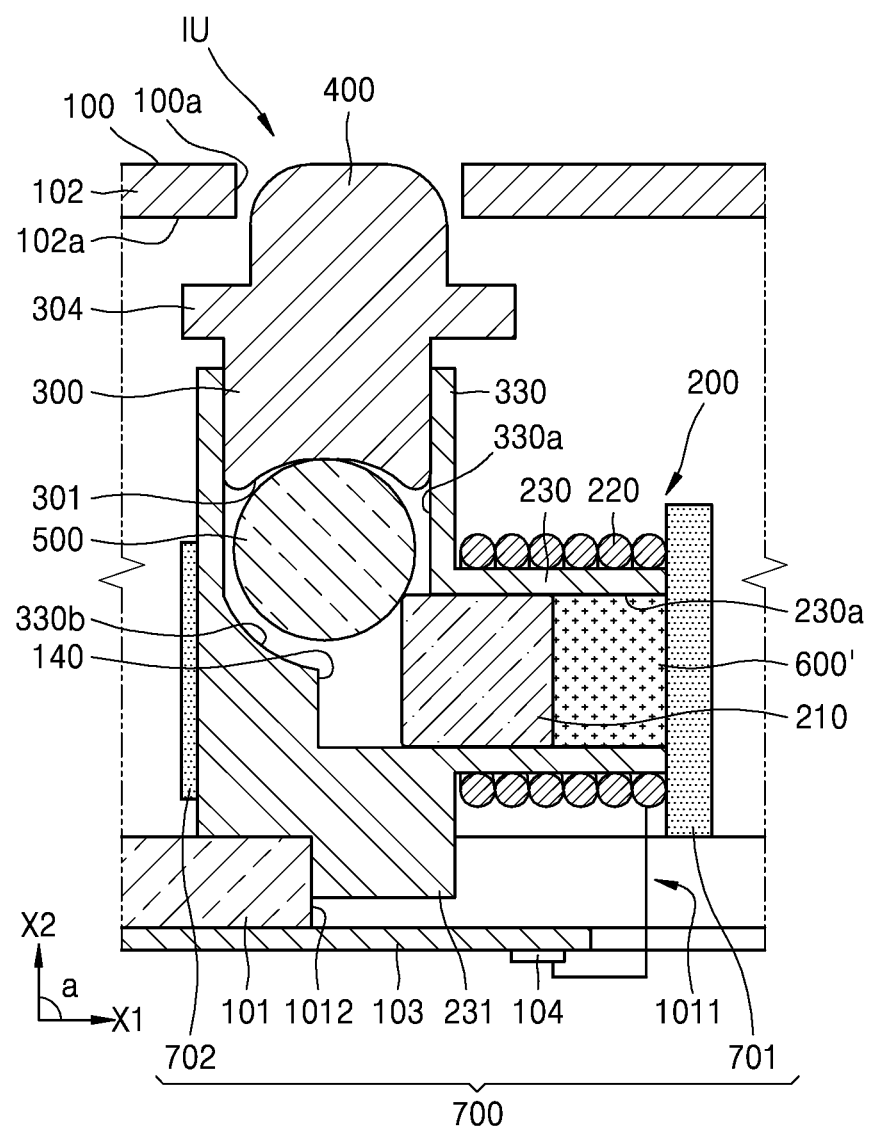
FIG. 26 is a cross-sectional view of an information output module according to another embodiment.

FIG. 26 is a cross-sectional view of an information output module IU2 according to another embodiment. Unlike the embodiment shown in FIGS. 25A and 25B, the embodiment of FIG. 26 includes a second stopper 600' having a cross-section corresponding to a cross-sectional shape of the first guide 230. According to an embodiment, since the first guide 230 is formed in a cylindrical shape, the second stopper 600' may have a cylindrical shape. Selectively, the second stopper 600' may be fixed inside the first guide 230, and may more solidly control the magnetic force member 210.

The embodiment shown in FIG. 26 is applicable to all the embodiments of the present specifications.

Figure 27:
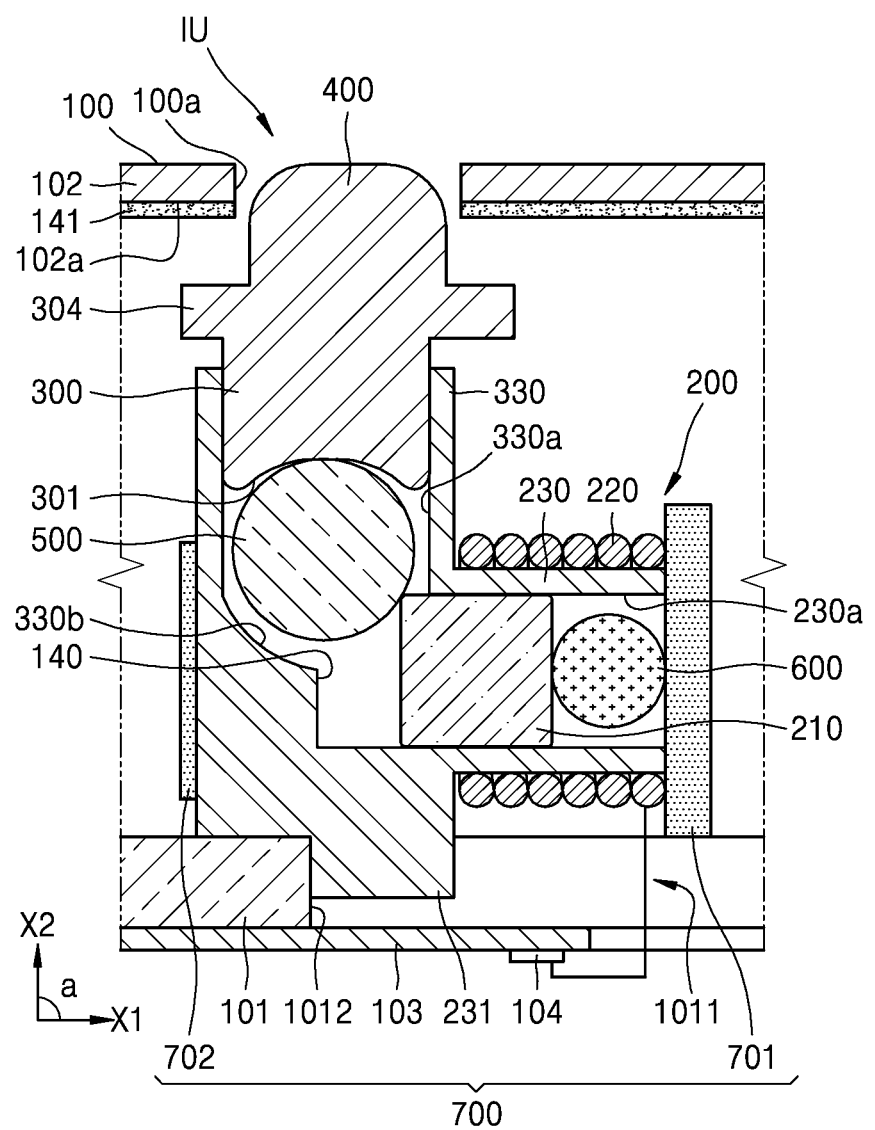
FIG. 27 is a cross-sectional view of an information output module according to another embodiment.

FIG. 27 is a cross-sectional view of an information output module IU according to another embodiment. The embodiment shown in FIG. 27 may further include an intermediate member 141 on the inner surface 102a of the second base 102 facing the first base 101 in addition to the embodiment shown in FIG. 25A.

In an embodiment, the intermediate member 141 may reduce noises due to a contact between the flange 304 of the second movement unit 300 and the inner surface 102a of the second base 102, and/or prevent damage of the flange 304 and/or the second base 102.

For this purpose, the intermediate member 141 may include various materials, for example, an elastic material. In an embodiment, the intermediate member 141 may include an organic material-based material. In another embodiment, the intermediate member 141 may include a urethane-based material as an elastic material. In an embodiment, the intermediate member 141 may include a material having excellent elasticity among silicon, rubber, and other polymers.

Though not shown in the drawing, the intermediate member 141 may be additionally or selectively installed on a surface of the flange 304 that faces the second base 102.

Though not shown in the drawing, the intermediate member 141 may be additionally or selectively installed on an outer surface of the first stopper 140, a lower surface of the second guide 330 facing the transfer unit 500, a surface of the first magnetic body 701 facing the magnetic force member 210, and/or at least a surface of the second stopper 600 facing the magnetic force member 210.

The embodiment shown in FIG. 27 is applicable to all the embodiments of the present specifications.

Figure 28:
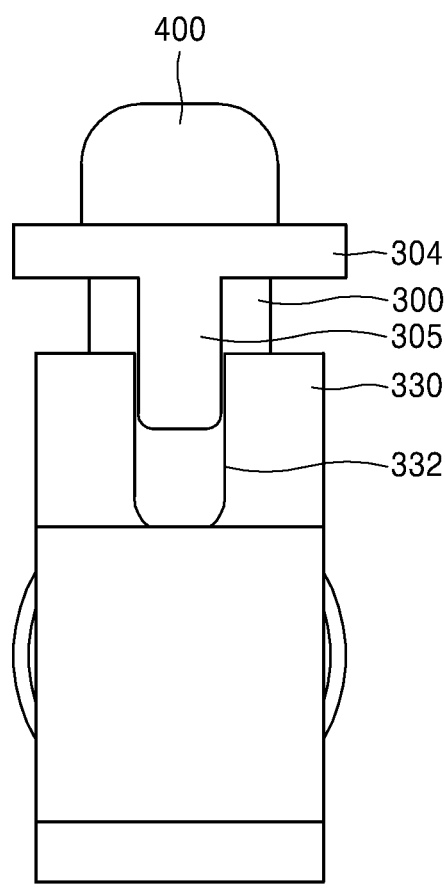
FIG. 28 is a view of a portion of an information output module according to another embodiment.

FIG. 28 is a view of a portion of an information output module according to another embodiment. According to the embodiment shown in FIG. 28, the second guide 330 may include a guide recess 332 extending in the second direction X2, and the second movement unit 300 may further include a guide pin 305 configured to be fit into the guide recess 332. The guide pin 305 may extend in the second direction X2 from the flange 304 to the first guide 230. Since the guide pin 305 is fit in the guide recess 332, stability of the motion of the second movement unit 300 may be provided when the second movement unit 300 moves in the second direction X2.

The embodiment shown in FIG. 28 is applicable to all the embodiments of the present specification.

The information output module according to the above embodiments may output one or more pieces of tactile information through the pin. In an embodiment, in the case where a plurality of information output modules are provided, various pieces of tactile information may be output to a user.

For example, the information output module may provide a tactile sense type information output by sensing a protrusion of the pin 400 through a sense of touch, and particularly, provide an information output of a braille output form.

Figure 29:
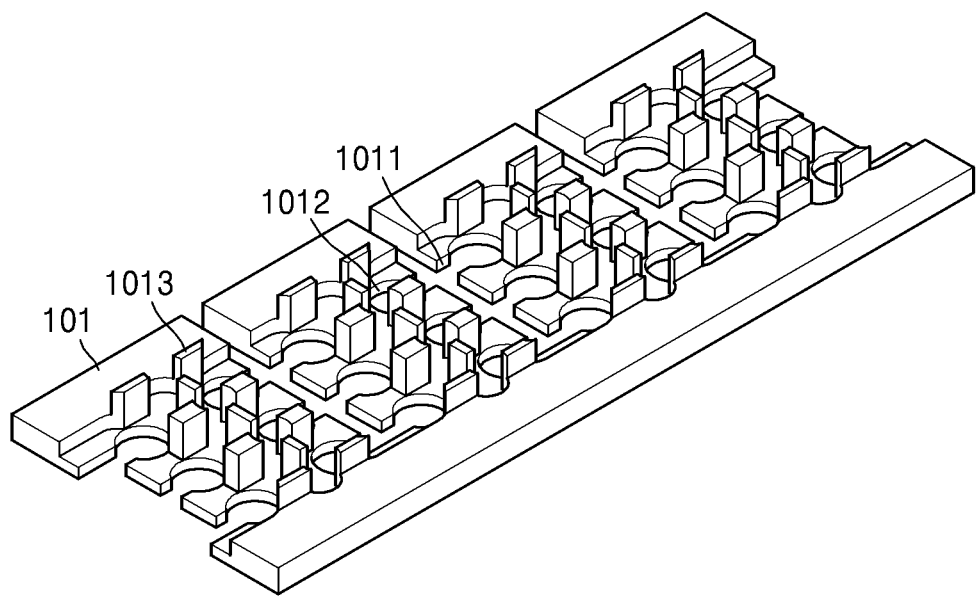
FIG. 29 is an exploded perspective view of a portion of a Braille display device.
Figure 29:
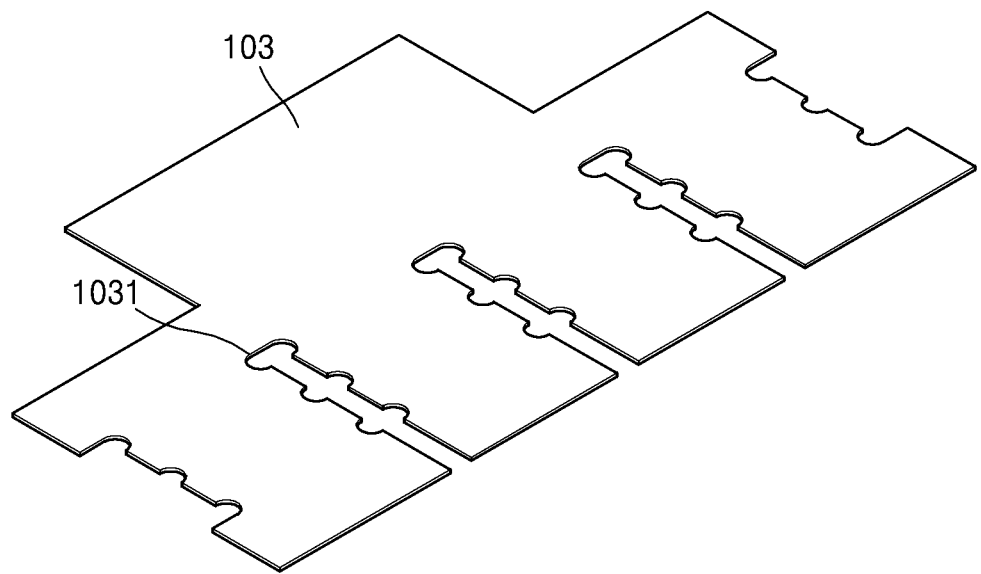

As shown in FIG. 29, the braille display device may include a partition structure 1013 such that the first base 101 fixedly mounts a plurality of information output modules therein. Also, a second through hole 1031 may be formed in a position of the board 103 corresponding to the first through hole 1011 of the first base 101, the board 103 being coupled to the first base 101. Therefore, an electric wire drawn from the coil member 112 may pass through the first through hole 1011 and the second through hole 1031 and may be electrically connected to a wiring of the board 103.

The embodiment is applicable to all the embodiments of the present specification.

Figure 30:
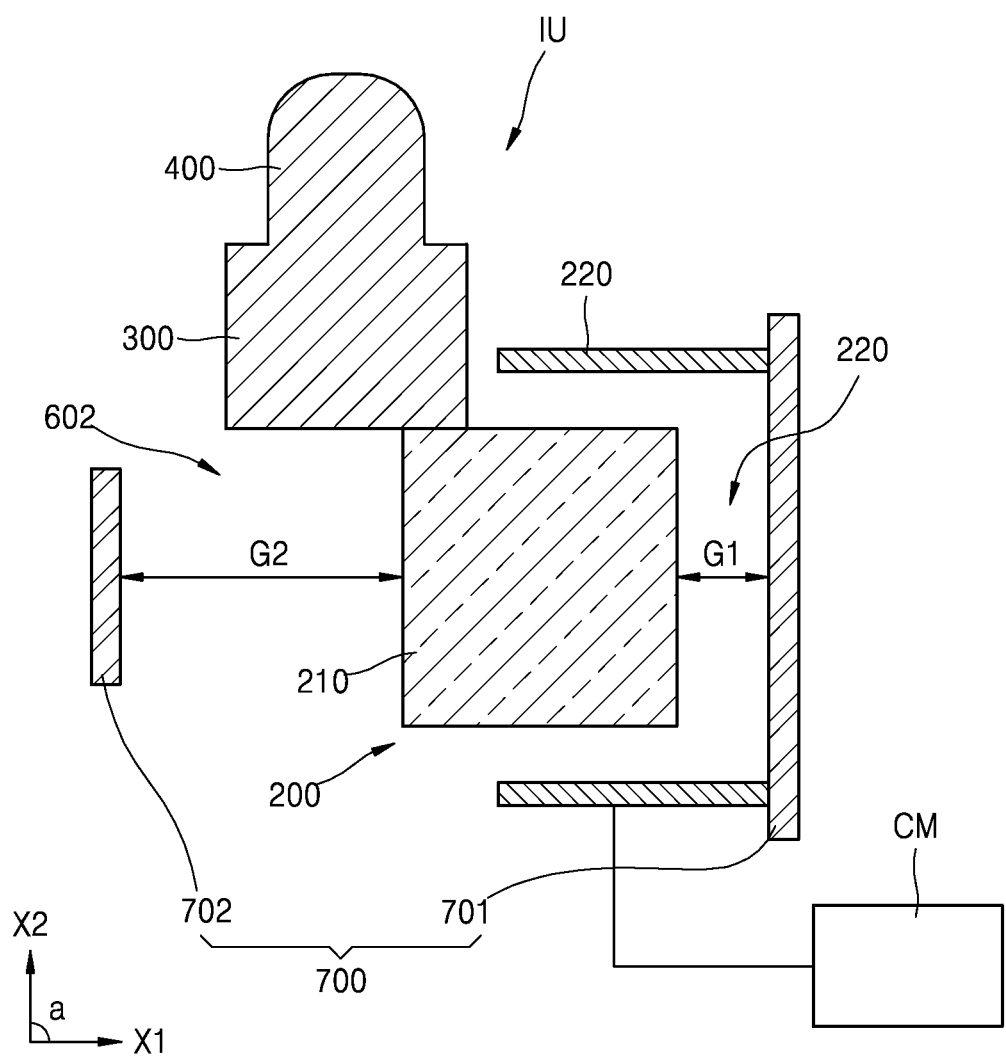
FIG. 30 is a configuration view of an information output module according to an embodiment.

FIG. 30 is a configuration view of the information output module IU according to an embodiment.

Referring to FIG. 30, the information output module IU according to an embodiment may include the first movement unit 200, the second movement unit 300, the pin 400, and the magnetic body 700.

The first movement unit 200 is electrically connected to the control module CM. The first movement unit 200 may be configured such that at least a portion of the first movement unit 200 moves in the first direction X1 when an electric signal from the control module CM is applied thereto. The expression of the electric connection does not necessarily denote a wired connection and includes transferring of a signal through wireless communication and includes existence of another transfer medium therebetween. This is equally applicable to embodiments of the present specification.

The second movement unit 300 may be configured to move in the second direction X2 in cooperation with the motion of the first movement unit 200. The second movement unit 300 may move, subject to the motion of the first movement unit 200. Therefore, the second movement unit 300 may not be electrically connected to the control module CM.

The pin 400 is driven by the second movement unit 300 and may move in the third direction. According to an embodiment, the pin 400 may be coupled to the second movement unit 300. In this case, since the second movement unit 300 moves in the second direction X2, the third direction is the same as the second direction X2. Therefore, the pin 400 may selectively protrude in the second direction X2 through the expression hole 100a.

The first movement unit 200 may include the magnetic force member 210 and the coil member 220.

According to an embodiment shown in FIG. 30, the information output module IU may further include at least one magnetic body 700 adjacent to the first movement unit 200.

According to an embodiment, the magnetic body 700 may include the first magnetic body 701 and the second magnetic body 702.

The magnetic body 700 may be configured in a plate shape, and for example, may include iron. However, the magnetic body 700 is not limited thereto and may include cobalt and/or nickel. Selectively, the magnetic body 700 may include a polymer material including a magnet material.

According to an embodiment, the second magnetic body 702 may be located to face the magnetic force member 210. The second magnetic body 702 may be spaced apart from the magnetic force member 210. Though not shown in the drawing, another member may be located between the second magnetic body 702 and the magnetic force member 210, and the other member may be a stopper including a non-magnetic body. The second magnetic body 702 may be located at the front when the magnetic force member 210 moves in the first direction X1.

When the magnetic force member 210 moves in the first direction X1, the second magnetic body 702 generates attractive force between the magnetic force member 210 and the second magnetic body 702 and thus the magnetic force member 210 may be fixed at a position advanced in the first direction X1 with power not applied to the coil member 220.

Since the pin 400 that has been protruded to the outside of the expression surface by a forward movement of the magnetic force member 210 in the first direction X1 may maintain a protruded state even while power is not applied to the coil member 220, power consumption for driving the pin 400 may be minimized. A magnitude of the attractive force of the second magnetic body 702 may be different depending on a thickness, a size and/or a position of the second magnetic body 702, and a second gap G2, which is a minimum gap between the second magnetic body 702 and the magnetic force member 210. The magnitude of the attractive force may be set by taking into account the motion of the magnetic force member 210 in the first direction X1.

According to an embodiment, the first magnetic body 701 may be located at a position facing the magnetic force member 210, and may be adjacent to the coil member 220. The first magnetic body 701 may be spaced apart from the magnetic force member 210. For this purpose, another member may be located between 601 the first magnetic body 701 and the magnetic force member 210. The other member may be a stopper including a non-magnetic body.

When the magnetic force member 210 moves in the first direction X1, the first magnetic body 701 generates attractive force between the magnetic force member 210 and the first magnetic body 701. Therefore, the magnetic force member 210 may be fixed at a position reversed in the first direction X1 with power not applied to the coil member 220. A magnitude of the attractive force of the first magnetic body

701 may be different depending on a thickness, a size and/or a position of the first magnetic body 701, and a first gap G1, which is a minimum gap between the first magnetic body 701 and the magnetic force member 210. The magnitude of the attractive force may be set by taking into account the motion of the magnetic force member 210 in the first direction X1.

When alternating current power is applied to the coil member 220 by the first magnetic body 701, an alternating magnetic field may occur, and due to electromotive force generated from the alternating magnetic field, force separate from magnetic force from the coil member 220 may act on the magnetic force member 210. Therefore, even in the case where the magnetic force from the coil member 220 is small, an efficient motion of the magnetic force member 210 may be obtained. To efficiently generate the alternating magnetic field, it is preferable that the coil member 220 is closely attached on the first magnetic body 701.

In the embodiment, the coil member 220 and the magnetic force member 210 may be located between the first magnetic body 701 and the second magnetic body 702. The first magnetic body 701 does not necessarily need to contact the coil member 220, and the second magnetic body 702 may contact the coil member 220, and the first magnetic body 701 may be spaced apart from the coil member 220. In this case, it is preferable that the coil member 220 is formed sufficiently long in the first direction X1 such that the magnetic force member 210 maintains a state in which the magnetic force member 210 is spaced apart from the second magnetic body 702.

The embodiments are applicable to all the embodiments of the present specifications.

Figure 31:
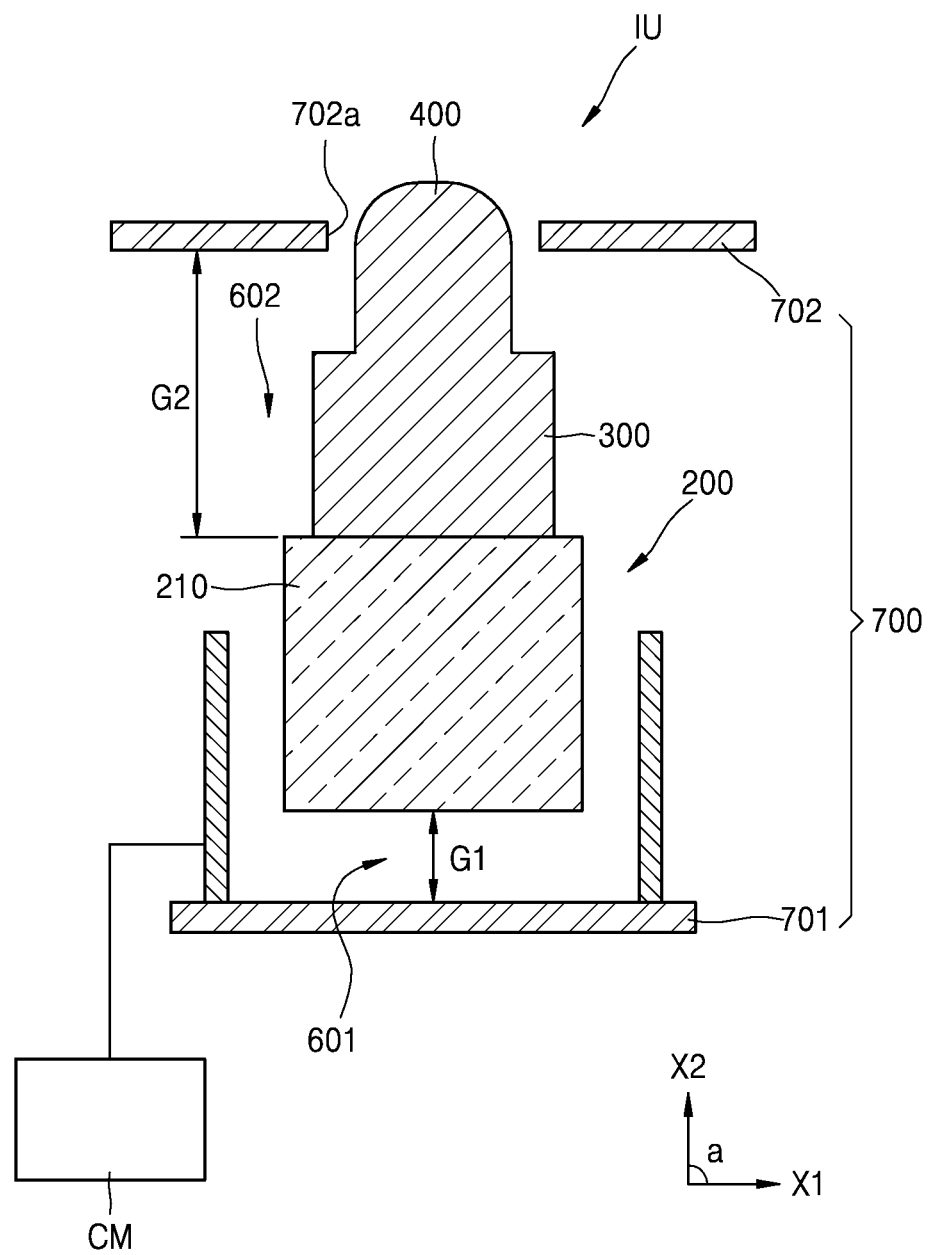
FIG. 31 is a configuration view of an information output module according to an embodiment.

FIG. 31 illustrates the information output module IU according to an embodiment.

Unlike the embodiment shown in FIG. 30, in the embodiment shown in FIG. 31, at least a portion of the first movement unit 200, for example, the magnetic force member 210 may move in the second direction X2, and the second movement unit 300 and the pin 400 may move in the second direction X2. For this purpose, the magnetic force member 210 may be fixedly coupled to the second movement unit 300, and is not limited thereto and a separate power transfer medium may be located between the magnetic force member 210 and the second movement unit 300.

In this structure, as described above, the first magnetic body 701 may be adjacent to the coil member 220, preferably closely attached on the coil member 220. The second magnetic body 702 may face the first magnetic body 701 and may be spaced apart from the magnetic force member 210. In this case, the second magnetic body 702 may include a hole 702*a*, and the pin 400 and/or the second movement unit 300 may move by passing through the hole 702*a*. According to an embodiment, the second magnetic body 702 may face the second movement unit 300 such that the second movement unit 300 is located between the second magnetic body 702 and the first magnetic body 701, and since the hole 702*a* may be formed less than the second movement unit 300, only the pin 400 may protrude through the hole 702*a*.

In the embodiment, the coil member 220 and the magnetic force member 210 may be located between the first magnetic body 701 and the second magnetic body 702. The first magnetic body 701 does not necessarily need to contact the coil member 220, and the second magnetic body 702 may contact the coil member 220, and the first magnetic body 701 may be spaced apart from the coil member 220. In this case, it is preferable that the coil member 220 is formed sufficiently long in the first direction X1 such that the magnetic force member 210 maintains a state in which the magnetic force member 210 is spaced apart from the second magnetic body 702.

The embodiments are applicable to all the embodiments of the present specification.

Figure 32:
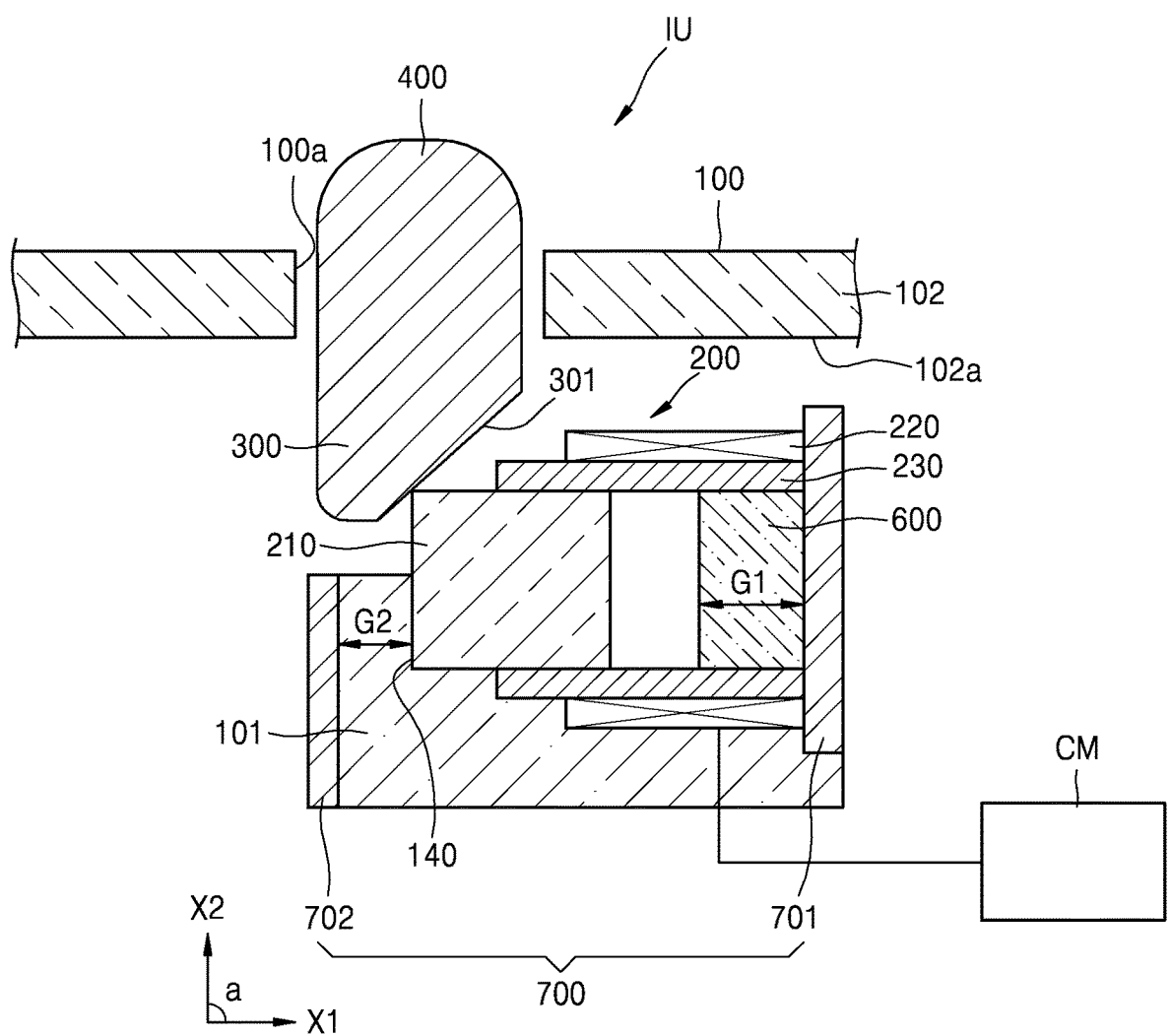
FIG. 32 is a cross-sectional view of an information output module according to a more specific embodiment.

FIG. 32 is a cross-sectional view of an information output module IU according to a more specific embodiment.

Like the embodiment shown in FIG. 30, in the embodiment shown in FIG. 32, the first movement unit 200 may move in the first direction X1, and the second movement unit 300 may move in the second direction X2. In this case, the first direction X1 and the second direction X2 may form a right angle.

According to the embodiment shown in FIG. 32, the second movement unit 300 may be formed as one body with the pin 400. Also, the second movement unit 300 may include the support surface 301. The support surface 301 may be inclined with respect to the first direction X1 or the second direction X2, and preferably, may be formed in a portion of the second movement unit 300 adjacent to the first movement unit 200. The support surface 301 contacts the magnetic force member 210 of the first movement unit 200 to receive power of the first movement unit 200. In this case, since the support surface 301 is inclined, the support surface 301 may more smoothly transfer the power from the magnetic force member 210 to the second movement unit 300. Also, excessive abrasion may be prevented from occurring on a power transfer surface during a repeated power transfer process. Though not shown in the drawing, the second movement unit 300 may be formed greater in the first direction X1 than a size of the expression hole 100*a* to prevent an assembly of the second movement unit 300 and the pin 400 from being detached from the expression hole 100*a*.

The embodiment is applicable to all the embodiments of the present specification.

The first movement unit 200 may include the first guide 230, and the first guide 230 may be formed in a pipe shape extending in the first direction X1. The first guide 230 is configured to include the first guide hole 230*a* therein, and the first guide hole 230*a* may extend in the first direction X1. The first guide hole 230*a* may be a cylindrical hole having a circular cross-section and is not limited thereto and may be a polygonal hole having a polygonal cross-section. Also, the first guide hole 230*a* is not limited to a hole having open two opposite ends and may have a recess shape having one open end.

The coil member 220 is wound on at least a partial outer surface of the first guide 230. Though not shown in the drawing, a recess may be formed in the outer surface of the first guide 230 such that the coil member 220 is easily wound. The first guide 230 may be fixedly coupled to the first base 101. Also, a surface of the first base 101 that faces the magnetic force member 210 may serve as the first stopper 140, and the motion of the magnetic force member 210 in the first direction X1 may be restrictively maintained by the first stopper 140.

The magnetic force member 210 may be inserted to the first guide hole 230*a* inside the first guide 230, the magnetic force member 210 may be guided by the first guide hole 230*a* to move. The magnetic force member 210 may perform a reciprocating motion in the first direction X1. In the case where the information output apparatus according to an embodiment is horizontally located on the ground, the magnetic force member 210 may move with less interferences of gravity. This may contribute to allowing the pin 400 to maintain a protruded state.

One end of the magnetic force member 210 may be inserted to the first guide hole 230a of the first guide 230, and another end of the magnetic force member 210 may support the support surface 301 of the second movement unit 300 as described above.

It is sufficient when only at least a portion of one pole of the magnetic force member 210 is inserted to the first guide 230. For example, only an N-pole or an S-pole of the magnetic force member 210 may be inserted to the first guide 230. Therefore, the magnetic force member 210 may be inserted to the first guide 230 by only half the length of the magnetic force member 210 or less. However, a degree of insertion of the magnetic force member 210 is not limited thereto and may change depending on a degree of winding of the coil member 220.

The second base 102 faces the first base 101, and may include a hole 100a such that the pin 400 is located in the hole 100a. A top surface of the second base 102 may serve as the expression surface 100 and is not limited thereto and another member may be located on the outer side of the second base 102 and an outer surface of the other member may serve as the expression surface 100.

Selectively, when a position of the information output apparatus changes like a case where the information output apparatus overturns, to prevent the pin 400 and/or the second movement unit 300 from protruding to the outside of the expression surface 100 with power not applied to the first movement unit 200, a separate apparatus (not shown) may be arranged between the pin 400 and/or the second movement unit 300 and the inner surface 102a of the second base 102. This apparatus may be an elastic member, and when moving force of the first movement unit 200 exceeds elastic force of the elastic member, the pin 400 may protrude to the outside of the expression surface 100. This embodiment is applicable to all of embodiments of the present specification.

Like the above embodiments, the information output module may further include at least one magnetic body 700 adjacent to the first movement unit 200.

According to an embodiment, the magnetic body 700 may include the first magnetic body 701 and the second magnetic body 702.

According to an embodiment, the second magnetic body 702 may be installed on the first base 101 such that the second gap G2 is maintained between the second magnetic body 702 and the magnetic force member 210. Therefore, the second gap G2 may be determined by a portion of the first base 101, and this portion of the first base 101 may include a non-magnetic body. The second gap G2 may be a distance between the second magnetic body 702 and the first stopper 140.

Also, the first magnetic body 701 may be installed on the first base 101 and/or the first guide 230 with the first gap G1 between the first magnetic body 701 and the magnetic force member 210 maintained. The first gap G1 may be set by a thickness of the second stopper 600 inserted to the first guide 230. The second stopper 600 may be inserted to the first guide 230, may include a non-magnetic body, and have a cross-sectional shape corresponding to a cross-sectional shape of the guide hole 230a of the first guide 230. However, the second stopper 600 is not limited thereto and may have any shape as far as the shape may prevent bonding of the magnetic force member 210 and the first magnetic body 701. For example, the second stopper 600 may have a ball shape. Selectively, the second stopper 600 may be formed as one body with the first guide 230.

The other descriptions of the first magnetic body 701 and the second magnetic body 702 are the same as the above embodiments.

Figure 33:
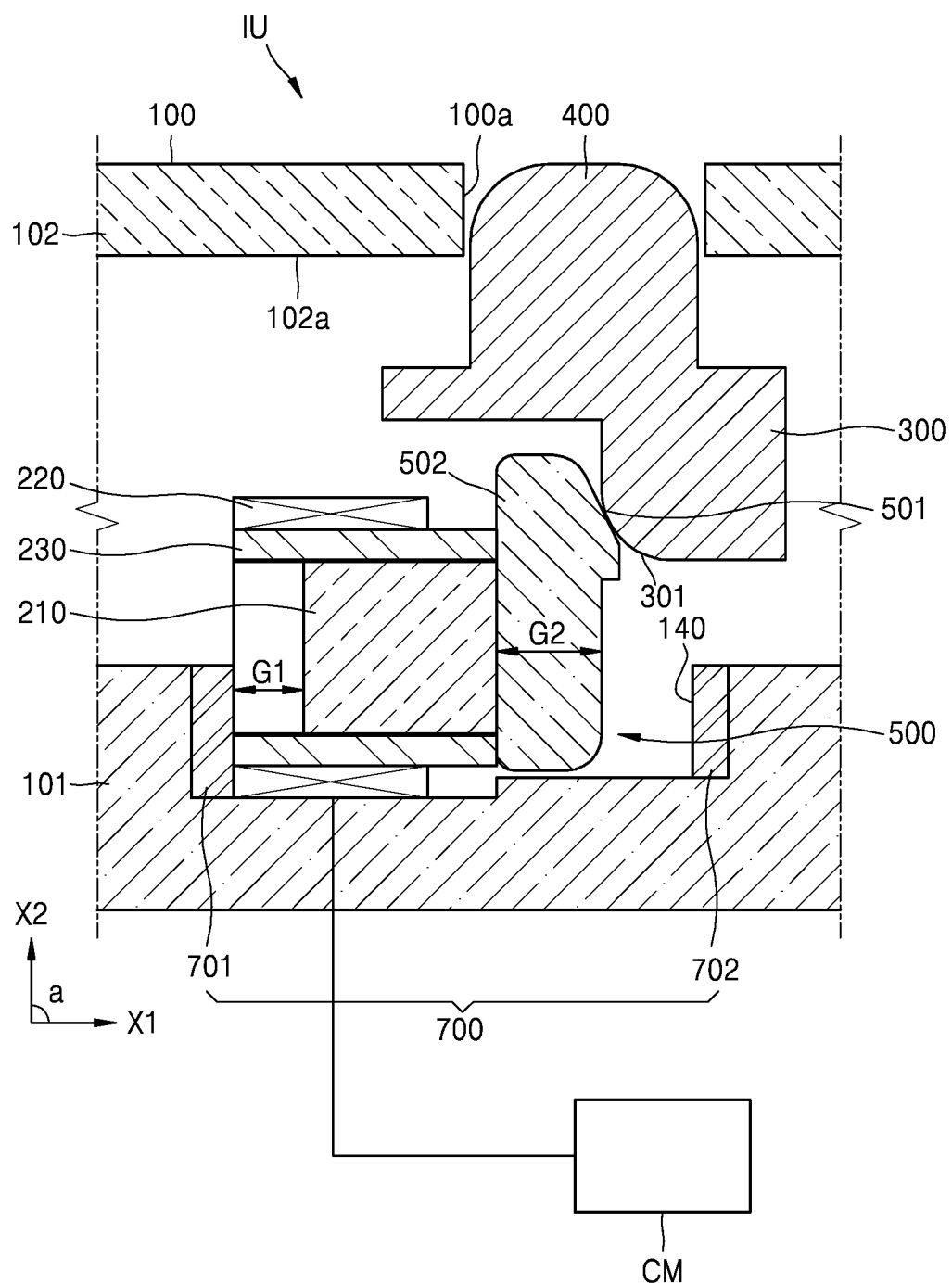
FIG. 33 is a cross-sectional view of an information output module according to another more specific embodiment.

FIG. 33 is a cross-sectional view of an information output module according to another more specific embodiment. In the embodiment shown in FIG. 33, the second movement unit 300 and the pin 400 may be formed as one body.

According to the embodiment shown in FIG. 33, the magnetic force member 210 is coupled to the transfer unit 500, and since the transfer unit 500 is greater than the first guide 230, the transfer unit 500 cannot enter the first guide 230. Since the magnetic force member 210 is shorter than a length of the first guide 230 in the first direction X1, the first gap G1 may be maintained between the first magnetic body 701 and the magnetic force member 210.

A surface of the second magnetic body 702 that faces the transfer unit 500 may serve as the first stopper 140, and the motion of the transfer unit 500 in the first direction X1 may be restrictively maintained. Also, since the transfer unit 500 is located between the magnetic force member 210 and the second magnetic body 702, the second gap G2 may be a thickness of the transfer unit 500 in the first direction X1.

In the embodiment, since a driving direction of the pin 400 and the second movement unit 300 is different from a driving direction of the first movement unit 200 and the transfer unit 500 which move the pin 400 and the second movement unit 300, the pin 400 may maintain a protruded state even after the pin 400 is protruded. In this case, even when electricity is not applied to the coil member 220, the pin 400 may maintain the protruded state. Therefore, an operation of the pin 400 may be freely performed without excessive power consumption.

Figure 34:
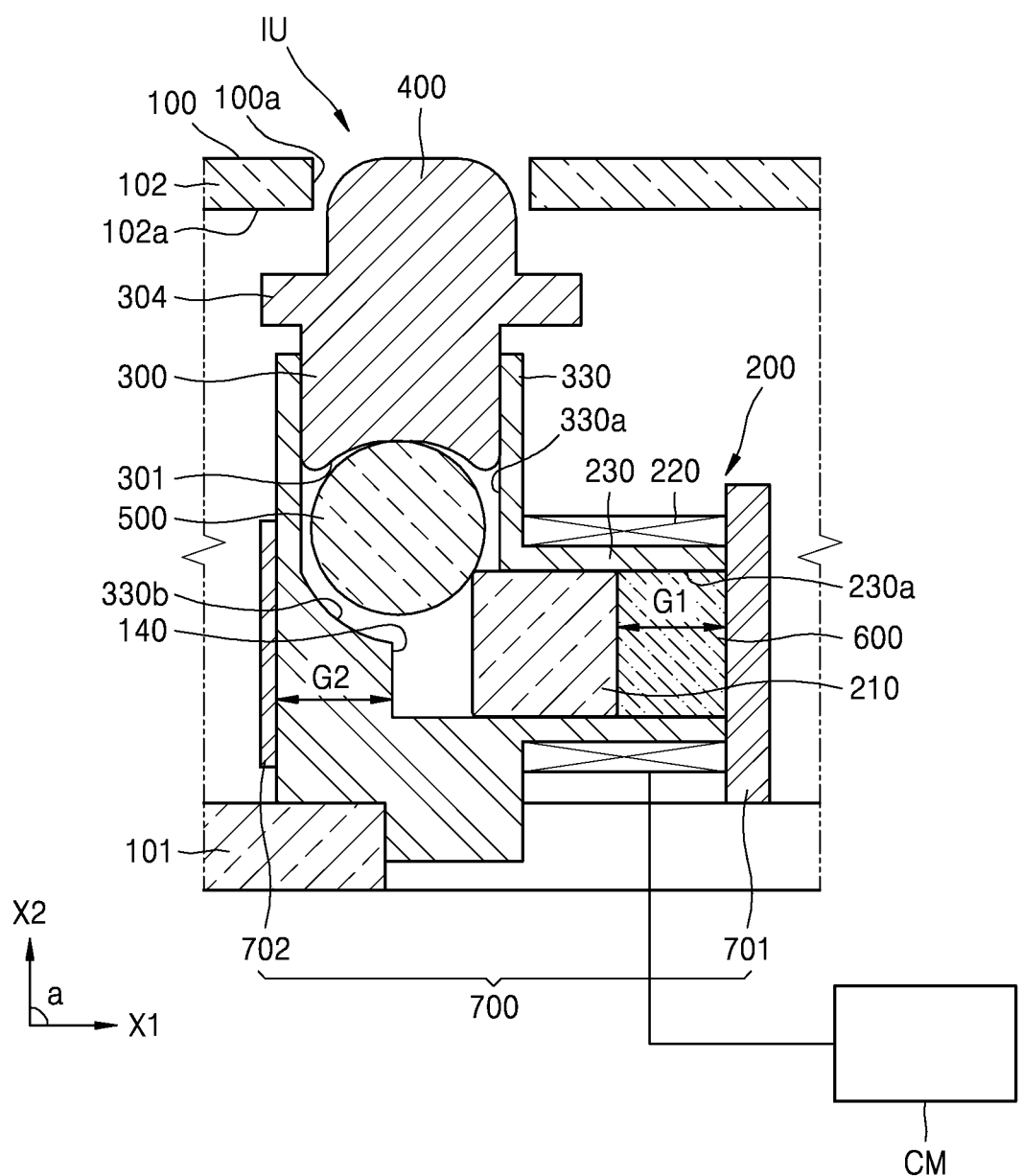
FIG. 34 is a cross-sectional view of an information output module according to another more specific embodiment.

FIG. 34 is a cross-sectional view of an information output module according to another more specific embodiment. In the embodiment shown in FIG. 34, the second movement unit 300 and the pin 400 may be formed as one body. Also, the transfer unit 500 configured to transfer a motion of the first movement unit 200 to the second movement unit 300 may be further arranged between the first movement unit 200 and the second movement unit 300. The transfer unit 500 may be separated from the first movement unit 200 and/or the second movement unit 300.

As shown in FIG. 34, an assembly of the first guide 230 and the second guide 330 may be located between the second magnetic body 702 and the magnetic force member 210, and the first guide 230 and the second guide 330 may include a non-magnetic body. The first stopper 140 may be located between the second magnetic body 702 and the magnetic force member 210. The second gap G2 may be maintained by a distance between the second magnetic body 702 and the first stopper 140.

The first magnetic body 701 may be located at a position that faces the magnetic force member 210, spaced apart from the magnetic force member 210, and may contact the coil member 220. The second stopper 600 may be further located between the first magnetic body 701 and the magnetic force member 210.

Also, the first magnetic body 701 may be installed on the first base 101 and/or the first guide 230 with the first gap G1 between the magnetic force member 210 and the first magnetic body 701 maintained. The first gap G1 may be set by a thickness of the second stopper 600 inserted to the first guide 230. The second stopper 600 may be inserted to the first guide 230, may include a non-magnetic body, and have a cross-sectional shape corresponding to a cross-sectional shape of the guide hole 230a of the first guide 230. However, the second stopper 600 is not limited thereto and may have any shape as far as the shape may prevent bonding of the magnetic force member 210 and the first magnetic body 701. For example, the second stopper 600 may have a ball shape. Selectively, the second stopper 600 may be formed as one body with the first guide 230.

Figure 35:
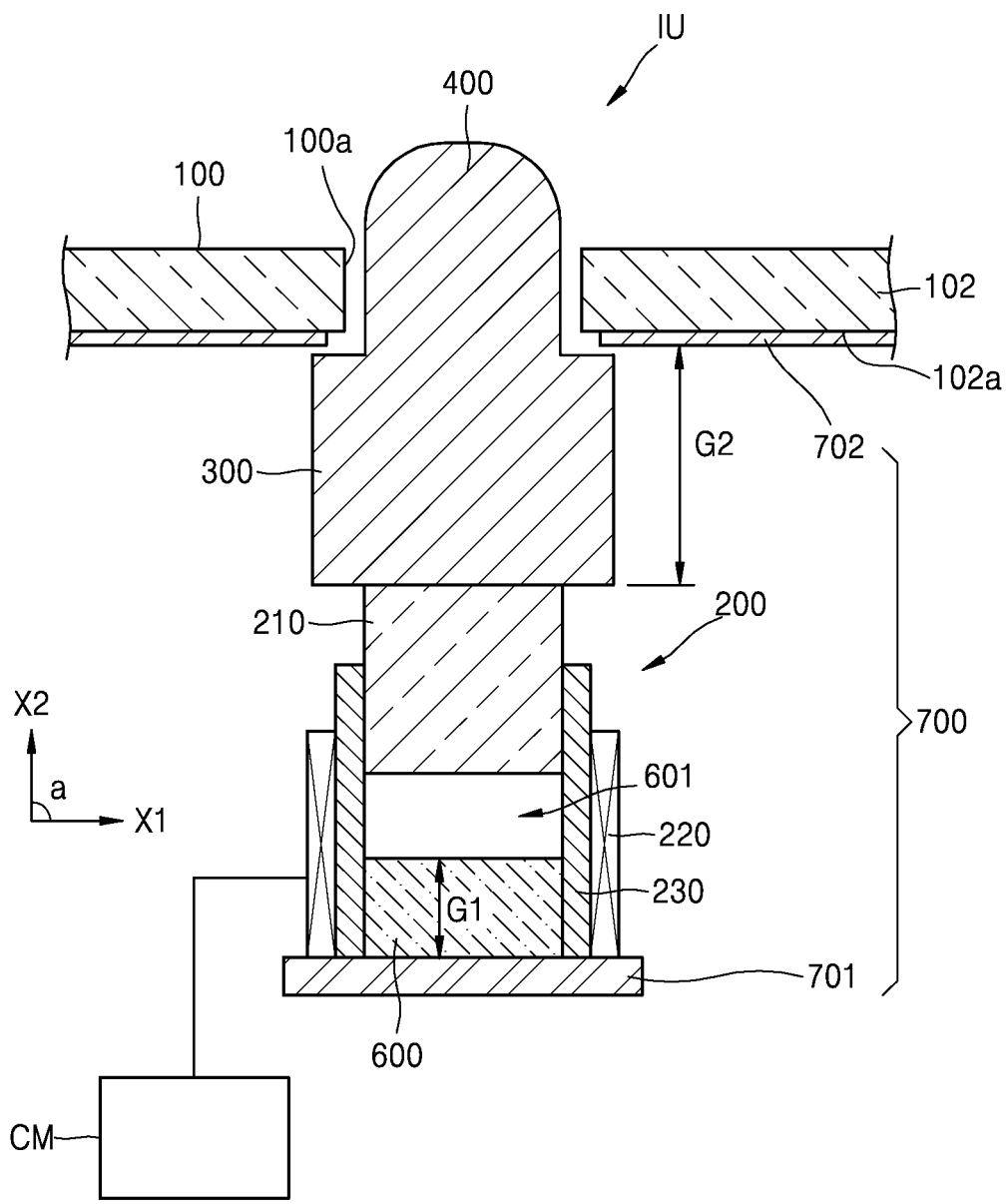
FIG. 35 is a cross-sectional view of an information output module according to another more specific embodiment.

FIG. 35 is a cross-sectional view of the information output module IU according to another more specific embodiment. In the embodiment shown in FIG. 35, the second movement unit 300 and the pin 400 may be formed as one body. The second movement unit 300 and the pin 400 move in the second direction X2, and the magnetic force member 210 may also move in the second direction X2 and transfer power to the second movement unit 300. For this purpose, the first guide 230 extends in the second direction X2 and the magnetic force member 210 inserted to the first guide 230 moves in the second direction X2. The coil member 220 is wound on an outer surface of the first guide 230 and is electrically connected to the control module CM as described above.

The second base 102 is installed to face the second movement unit 300 and includes the hole 100a such that the pin 400 may be located in the hole 100a. A top surface of the second base 102 may serve as the expression surface 100 and is not limited thereto and another member may be located on the outer side of the second base 102 and an outer surface of the other member may serve as the expression surface 100.

The second movement unit 300 may be greater in the first direction X1 than a size of the expression hole 100a to prevent the assembly of the second movement unit 300 and the pin 400 from being detached from the expression hole 100a.

Selectively, when a position of the information output apparatus changes like a case where the information output apparatus overturns, to prevent the pin 400 and/or the second movement unit 300 from protruding to the outside of the expression surface 100 with power not applied to the first movement unit 200, a separate apparatus (not shown) may be arranged between the pin 400 and/or the second movement unit 300 and the inner surface 102a of the second base 102. This apparatus may be an elastic member, and when moving force of the first movement unit 200 exceeds elastic force of the elastic member, the pin 400 may protrude to the outside of the expression surface 100. This embodiment is applicable to all of embodiments of the present specification.

Like the above embodiments, the information output module may further include at least one magnetic body 700 adjacent to the first movement unit 200. According to an embodiment, the magnetic body 700 may include the first magnetic body 701 and the second magnetic body 702.

According to an embodiment, the first magnetic body 701 may be adjacent to the first guide 230 with the first gap G1 between the magnetic force member 210 and the first magnetic body 701 maintained. Like the above embodiments, the first magnetic body 701 may contact the coil member 220. The first gap G1 may be set by a thickness of the second stopper 600 inserted to the first guide 230. The second stopper 600 may be inserted to the first guide 230 and may include a non-magnetic body, and may have a cross-sectional shape corresponding to a cross-sectional shape of the guide hole 230a of the first guide 230. However, the second stopper 600 is not limited thereto and may have any shape as far as the shape may prevent bonding of the magnetic force member 210 and the first magnetic body 701. For example, the second stopper 600 may have a ball shape. Selectively, the second stopper 600 may be formed as one body with the first guide 230.

The second magnetic body 702 may be installed on the inner surface 102a of the second base 102 such that the second gap G2 between the magnetic force member 210 and the second magnetic body 702 is maintained. Since the second gap G2 is a minimum gap between the second magnetic body 702 and the magnetic force member 210, in a structure in which the second movement unit 300 is formed large such that the second movement unit 300 does not pass through the expression hole 100a, the second gap G2 may be determined by a thickness of the second movement unit 300 in the second direction X2. Therefore, the second movement unit 300 is located between the second magnetic body 702 and the magnetic force member 210, and the second movement unit 300 may include a non-magnetic body.

The other descriptions of the first magnetic body 701 and the second magnetic body 702 are the same as the above embodiments.

According to the embodiment, since a response speed of the pin 400 in response to an electric signal applied to the coil member 220 may be made fast and a resistance against a motion of the pin 400 may be minimized, a precise motion of the pin 400 may be achieved with low power consumption.

Although the disclosure has been described with reference to the embodiments illustrated in the drawings, this is merely provided as an example and it will be understood by those of ordinary skill in the art that various changes in form and details and equivalents thereof may be made therein without departing from the spirit and scope of the disclosure as defined by the following claims.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical."

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

INDUSTRIAL APPLICABILITY

The present disclosure may be used for a Braille display device and/or various tactile display devices.

The invention claimed is:

1. An information output apparatus comprising:
   an expression surface including a plurality of expression holes; and
   a plurality of output modules,
   wherein each of the plurality of output modules includes:
   a pin configured to protrude to the expression surface through the respective plurality of expression holes and express a protrusion signal on the expression surface;
   a first movement assembly located at an inner side of the expression surface and configured such that at least a portion of the first movement assembly moves in a first direction when an electric signal is applied thereto, wherein the first movement assembly includes a magnet;
   a second movement assembly located at the inner side of the expression surface and configured to move in a second direction different from the first direction in cooperation with a motion of the first movement assembly and drive each of the plurality of pins such that each of the plurality of pins protrudes to the expression surface through each of the expression holes; and
   a plurality of magnetic bodies which face the first movement assembly,
   wherein each of the plurality of magnetic bodies is spaced apart from the magnet.

2. The information output apparatus of claim 1, wherein the expression surface includes a curved surface.

3. The information output apparatus of claim 1, wherein the first direction and the second direction form a directional angle, and the directional angle is greater than 0° and less than 180°.

4. The information output apparatus of claim 1, wherein the first movement assembly further includes:
   a first guide in which a first guide hole is provided; and
   a coil member located on an outer side of the first guide and to which the electric signal is applied,
   wherein the magnet is located in the first guide hole.

5. The information output apparatus of claim 4, wherein at least one of the magnet, the first guide, and the second movement assembly includes an inclined surface inclined with respect to the first direction or the second direction.

6. The information output apparatus of claim 4, wherein the first movement assembly further includes a stopper located in the first guide hole.

7. The information output apparatus of claim 1, wherein each of the plurality of output module further includes a second guide configured to guide movement of the second movement assembly.

8. The information output apparatus of claim 1, wherein each of the plurality of output modules further includes a transfer body arranged between the first movement assembly and the second movement assembly and configured to transfer the motion of the first movement assembly to the second movement assembly.

9. An information output apparatus comprising:
   a first movement assembly including a magnet and a coil and configured such that at least a portion of the first movement assembly performs a reciprocating motion in a first direction in response to an electric signal applied to the coil;
   a second movement assembly configured to cooperate with the motion of the first movement assembly and perform a reciprocating motion in a second direction different from the first direction;
   a pin configured to perform a reciprocating motion in a third direction in cooperation with the motion of the second movement assembly; and
   a plurality of magnetic bodies which face the first movement assembly,
   wherein each of the plurality of magnetic bodies is spaced apart from the magnet.

10. The information output apparatus of claim 9, wherein the third direction is the same as the second direction.

11. The information output apparatus of claim 9, further comprising a first guide in which a first guide hole is provided,
   wherein the member is located in the first guide hole, and the coil is located on an outer side of the first guide.

12. The information output apparatus of claim 11, wherein at least one of the magnet, the first guide, and the second movement assembly includes an inclined surface inclined with respect to the first direction or the second direction.

13. The information output apparatus of claim 11, further comprising a stopper located in the first guide hole.

14. The information output apparatus of claim 11, wherein at least one magnetic body of the plurality of magnetic bodies faces the magnet and is adjacent to the coil.

15. The information output apparatus of claim 9, further comprising a second guide configured to guide the motion of the second movement assembly.

16. The information output apparatus of claim 9, further comprising:
   a first guide in which a first guide hole that extends in the first direction is provided; and
   a second guide in which a second guide hole that extends in the second direction is provided, the second guide being connected to the first guide,
   wherein the magnet is located in the first guide hole, the coil is located on an outer side of the first guide, and at least a portion of the second movement assembly is located in the second guide hole.

17. The information output apparatus of claim 9, further comprising a transfer body arranged between the first movement assembly and the second movement assembly and configured to transfer the motion of the first movement assembly to the second movement assembly.

* * * * *